(12) United States Patent
Kitoh et al.

(10) Patent No.: US 8,483,525 B2
(45) Date of Patent: Jul. 9, 2013

(54) OPTICAL WAVELENGTH MULTIPLEXING/DEMULTIPLEXING CIRCUIT, OPTICAL MODULE USING OPTICAL WAVELENGTH MULTIPLEXING/DEMULTIPLEXING CIRCUIT, AND COMMUNICATION SYSTEM

(75) Inventors: Tsutomu Kitoh, Atsugi (JP); Shin Kamei, Atsugi (JP); Toshikazu Hashimoto, Atsugi (JP); Yohei Sakamaki, Atsugi (JP); Hiroshi Takahashi, Atsugi (JP); Manabu Oguma, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 241 days.

(21) Appl. No.: 13/143,161

(22) PCT Filed: Jan. 8, 2010

(86) PCT No.: PCT/JP2010/000082
§ 371 (c)(1),
(2), (4) Date: Jul. 1, 2011

(87) PCT Pub. No.: WO2010/079761
PCT Pub. Date: Jul. 15, 2010

(65) Prior Publication Data
US 2011/0268447 A1 Nov. 3, 2011

(30) Foreign Application Priority Data
Jan. 9, 2009 (JP) .................. 2009-003524

(51) Int. Cl.
*G02B 6/12* (2006.01)
(52) U.S. Cl.
USPC .......................................... 385/14

(58) Field of Classification Search
USPC ............................................. 385/14
See application file for complete search history.

(56) References Cited

U.S. PATENT DOCUMENTS 6,304,687 B1  10/2001  Inoue et al.
6,728,446 B2 *  4/2004  Doerr .............................. 385/37
(Continued)

FOREIGN PATENT DOCUMENTS

| CN | 101208890 | 6/2008 |
| JP | 2002-169040 | 6/2002 |

(Continued)

OTHER PUBLICATIONS

Kamei et al., *Low-loss and Flat-passband Athermal AWG*, 2008 Nen Denshi Joho Tsushin Gakkai Sogo Zenkoku Taikai Koen Ronbunshu Electronics 1, Mar. 2008, p. 205.
(Continued)

*Primary Examiner* — Sung Pak
(74) *Attorney, Agent, or Firm* — Workman Nydegger

(57) ABSTRACT

When a conventional synchronized AWG is employed to extend a transmission passband, an increase in loss near the optical center frequency can not be avoided. Because of passband width limit, a problem has existed in that the synchronized AWG could not be applied for a large, complicated communication system wherein a signal light passes a number of points. Therefore, an optical wavelength multiplexing/demultiplexing circuit of the present invention is a synchronized AWG, which includes an optical splitter arranged in an interference circuit that is connected on the side of one slab waveguide. The splitting ratio of the optical splitter varies, depending on the optical frequency, and the value becomes minimum near the optical center frequency of the synchronized AWG. The optical splitter is operated so that the splitting ratio is comparatively great at optical frequencies distant from the optical center frequency.

17 Claims, 36 Drawing Sheets

U.S. PATENT DOCUMENTS

| | | | |
|---|---|---|---|
| 7,706,648 B2 * | 4/2010 | Doerr | 385/37 |
| 2003/0128926 A1 * | 7/2003 | Doerr | 385/37 |
| 2003/0133655 A1 * | 7/2003 | Dingel | 385/37 |
| 2003/0223694 A1 * | 12/2003 | Nikonov et al. | 385/39 |
| 2008/0044122 A1 | 2/2008 | Fondeur et al. | |

FOREIGN PATENT DOCUMENTS

| | | |
|---|---|---|
| JP | 2003-149474 | 5/2003 |
| JP | 2007-310387 | 11/2007 |
| JP | 4100489 | 3/2008 |
| WO | WO 98-36299 | 8/1998 |

OTHER PUBLICATIONS

Kamei, *Recent Progress on Athermal AWG Wavelength Multiplexer*, OSA/OFC/NFOEC 2009, 3 pages.

PCT/JP2010/000082, Feb. 16, 2010, International Search Report.

PCT/JP2010/000082, Aug. 25, 2011, International Preliminary Report.

European Search Report issued May 14, 2012 in EP Application No. 10729181.7.

M. Kohtoku et al., *Low-Loss Flat-Top Passband Arrayed Waveguide Gratings Realised by First-Order Mode Assistance Method*, Electronics Letters, vol. 38, No. 15, Jul. 18, 2002, 2 pages.

Tsutomu Kitoh, *Recent Progress on Arrayed-Waveguide Grating Multi-Demultiplexers Based on Silica Planar Lightwave Circuits*, Proc. of SPIE, vol. 7135, 2008, XP040444727, 10 pages.

Leuthold et al., *Multimode Interference Couplers for the Conversion and Combining of Zero- and First-Order Modes*, Journal of Lightwave Technology, vol. 16, No. 7, Jul. 1998, pp. 1228-1239.

Office Action dated Nov. 16, 2012 from related Chinese application No. 201080004034.8.

\* cited by examiner (a)
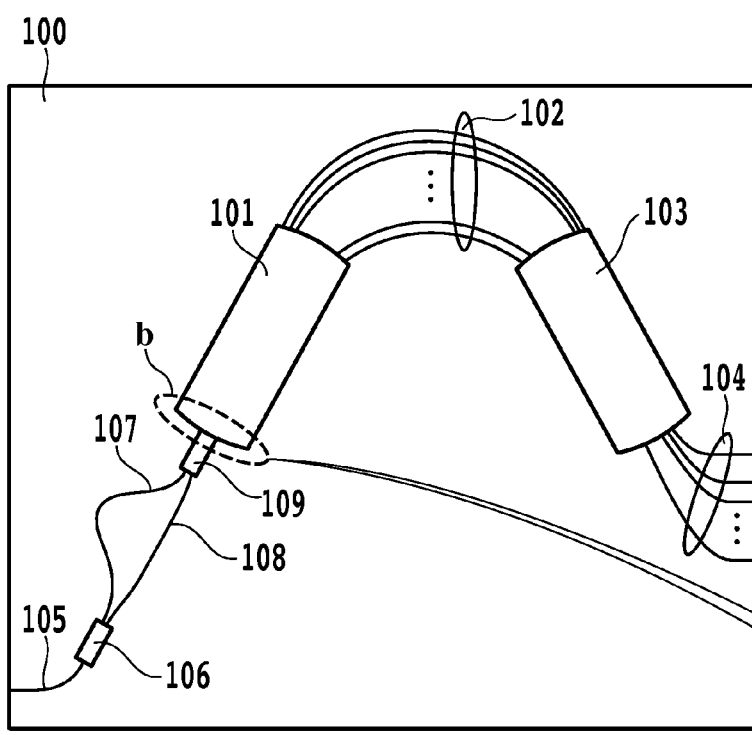
(b)
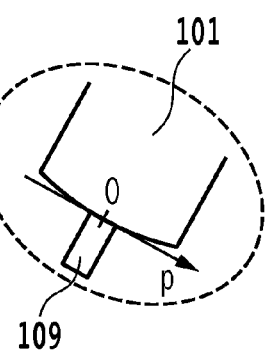
FIG.1

(a)
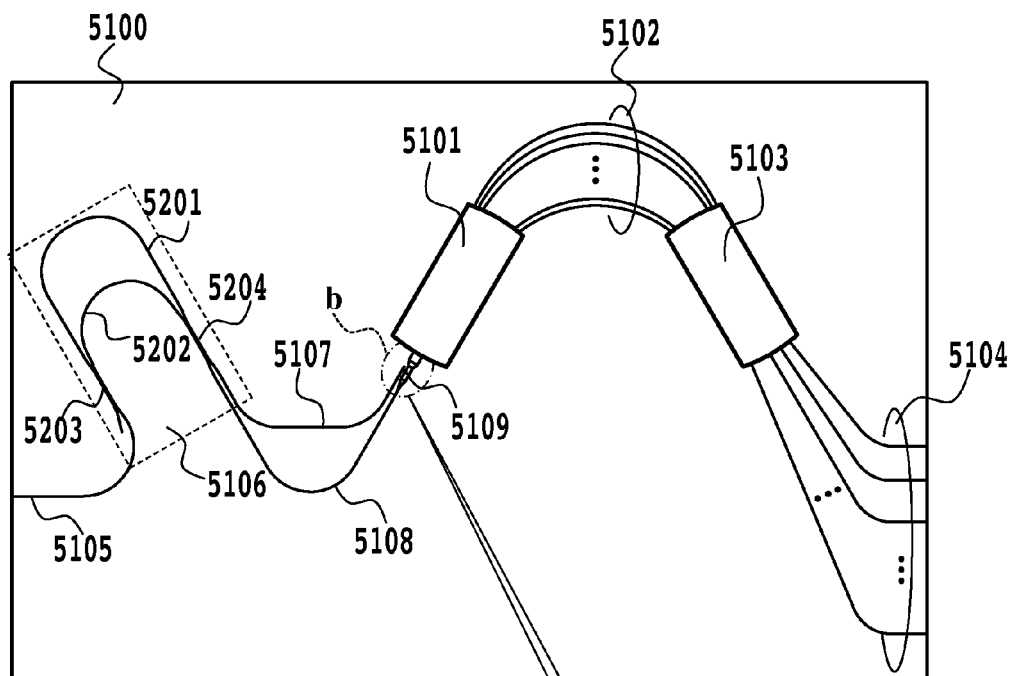
(b)
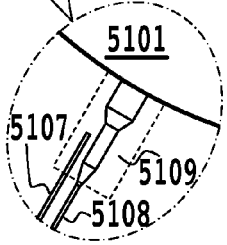
FIG.30

OPTICAL WAVELENGTH MULTIPLEXING/DEMULTIPLEXING CIRCUIT, OPTICAL MODULE USING OPTICAL WAVELENGTH MULTIPLEXING/DEMULTIPLEXING CIRCUIT, AND COMMUNICATION SYSTEM

TECHNICAL FIELD

The present invention relates to an optical wavelength multiplexing/demultiplexing circuit. More particularly, the present invention relates to an optical wavelength multiplexing/demultiplexing circuit that is designed to use an arrayed-waveguide grating as a basic structure, and to employ a large passband.

BACKGROUND ART

Active studies and developments have been performed for a planar lightwave circuit (hereinafter referred to as a PLC) that includes a silica based waveguide formed on a silicon substrate. An arrayed waveguide grating (hereinafter referred to as an AWG), a product of the PLC technology, plays an important role in an optical communication system. The AWG is an optical wavelength multiplexing/demultiplexing circuit that has a function for demultiplexing signal light (wavelength multiplexed signal) obtained by multiplexing a plurality of optical frequencies, and providing individual signal lights arranged for predetermined optical frequency channel spacing, or multiplexing the individual signal lights to obtain a single wavelength multiplexed signal.

In accordance with the development of an optical communication system, building of a network system has also begun, wherein multiple points are connected using a ring network, or a mesh network, and communication paths are flexibly changed. For such a high-level network, it has been requested that optical signals be passed through multiple points unchanged, without having to be converted into electric signals. Therefore, an optical wavelength multiplexing/demultiplexing circuit such as is described herein, should have a wide, flat passband and exhibit low-loss transmission. As an optical wavelength multiplexing/demultiplexing circuit having a superior transmission property, proposed in patent document 1 is a synchronized AWG type of optical wavelength multiplexing/demultiplexing circuit that employs both an interference circuit and an AWG. This synchronized type of optical wavelength multiplexing/demultiplexing circuit is characterized in that when an optical signal repetitively passes through a plurality of optical wavelength multiplexing/demultiplexing circuits, there is little deterioration of the optical signal, or a loss is changed little, relative to a fluctuation in the wavelength of an optical signal.

FIG. 23 is a plan view of an example arrangement employed for a conventional synchronized AWG optical wavelength multiplexing/demultiplexing circuit. An optical wavelength multiplexing/demultiplexing circuit 3100 includes a first slab waveguide 3101, arrayed waveguides 3102, a second slab waveguide 3103, second input and output waveguides 3104 and a first input and output waveguide 3105. An optical splitter 3106, a first arm waveguide 3107, a second arm waveguide 3108 and an optical mode converter 3109 are sequentially connected between the first input and output waveguide 3105 and the first slab waveguide 3101. The individual components located between the first input and output waveguide 3105 and the first slab waveguide 3101 constitute an interference circuit.

A synchronized AWG optical wavelength multiplexing/demultiplexing circuit having the above arrangement performs the following operation. Light waves having a plurality of wavelengths enter the first input and output waveguide 3105, and thereafter, they are split by the optical splitter 3106 and are guided to the first arm wavelength guide 3107 and the second arm waveguide 3108. Thereafter, the light waves are propagated as fundamental mode light along the two arm waveguides 3107 and 3108. As a result, because the two arm waveguides have different optical path lengths, a phase difference is generated between the split light waves according to the wavelengths. Thereafter, the separated light waves are again merged at the optical mode converter 3109.

At this time, the fundamental mode that entered the optical mode converter 3109 via the first arm waveguide 3107 is converted into the 1st mode. However, the other fundamental mode light that entered the optical mode converter 3109 via the second arm waveguide 3108 is merged unchanged. Therefore, the light wave output by the optical mode converter 3109 is light provided by the coupling of the fundamental mode light and the 1st mode. The field property of the combined light is altered according to the phase difference between the fundamental mode light and the 1st mode light, i.e., the wavelength of the light.

FIG. 24 is a diagram illustrating an example structure for the vicinity of the optical mode converter of the above described optical wavelength multiplexing/demultiplexing circuit. The optical mode converter 3109 is provided using a directional coupler that includes waveguides that are asymmetrical in width. A waveguide 3109a and a waveguide 3109b are respectively connected to the first arm waveguide 3107 and the second arm waveguide 3108. When the individual waveguide widths are set so as to almost match the effective refractive index of the fundamental mode light passed through the waveguide 3109a, and the effective refractive index of the 1st mode light passed through the waveguide 3109b, the optical mode converter 3109 serves as an optical mode converter for the fundamental mode light and the 1st mode light.

Further, multimode waveguides 3201 and 3203 are sequentially connected to the waveguides 3109b. A tapered waveguide 3202 is connected between the two multimode waveguides 3201 and 3203. However, these waveguides 3201 and 3202 are not requisite components, and are arranged in a case wherein adjustment is required for the widths of the waveguides that are to be connected to the first slab waveguide 3101. Furthermore, the multimode waveguides 3201 and 3203 and the tapered waveguide 3202 should at least enable the propagation of the fundamental mode and the 1st mode. At the terminal end (p axis) of the multimode waveguide 3203 that is connected to the first slab waveguide 3101, the optical field is periodically changed according to a phase difference (a wavelength), and accordingly, the position of the peak of the optical field obtained by light coupling is periodically changed along the p axis.

As described above, an interference circuit arranged between the first input and output waveguide 3105 and the first slab waveguide 3101 transmits, to the first slab waveguide 3101, a light wave that periodically changes the peak position of the optical field according to a wavelength.

Thereafter, based on a difference in an optical path length between waveguides that are adjacent to each other among the arrayed waveguides 3102, a phase difference consonant with a waveform is provided for the light wave that entered the first slab waveguide 3101. Then, the focusing position of the light wave at the terminal end of the second slab waveguide 3103 is changed according to the phase difference (i.e., the wavelength of the light wave that is input). That is, a light wave having a desired wavelength is divided between the second input and output waveguides 3104 that correspond to the focusing position at the terminal end of the second slab waveguide 3103.

For the above described optical wavelength multiplexing/demultiplexing circuit, when the peak location of the optical field is changed at the terminal end of the multimode waveguide 3203, the location at which the light wave enters the first slab waveguide 3101 is also changed. And when the location of the entry for the first slab waveguide 3101 has been changed, the lengths of the optical paths leading to the individual waveguides in the arrayed waveguides 3102 are changed. That is, when a difference in an optical path length is not changed between the adjacent waveguides in the arrayed waveguides 3102, a change occurs in a difference in an optical path length for the entire optical wavelength multiplexing/demultiplexing circuit 3100. As a result, the focusing position for light is changed at the terminal end of the second slab waveguide 3103.

The process sequence performed by the interference circuit described above and by the entire AWG indicates that a difference in an optical path length between the first arm waveguide 3107 and the second arm waveguide 3108 can be employed to adjust the focusing position of a light wave at the terminal end of the second slab waveguide 3103. Furthermore, the parameters for the AWG and the interference circuit on the first slab waveguide side may be set, so that in a specific waveform region, for example, a change in the peak position of the optical field at the terminal end of the multimode waveguide 3203 is synchronized with a change in the focusing position of light at the terminal end of the second slab waveguide 3103, which occurs due to a difference in an optical path length between the adjacent waveguides in the arrayed waveguides 3102. When these changes are synchronized, the position at which light focuses on the terminal end of the second slab waveguide 3103 can be maintained, and a flat transmission spectrum can be obtained for the optical wavelength multiplexing/demultiplexing circuit.

To perform the above described synchronous operation for the AWG, it is required that the optical frequency channel spacing of light to be demultiplexed to the second input and output waveguides 3104 match the optical frequency spacing of the interference circuit that is connected to the first slab waveguide 3101. The optical wavelength multiplexing/demultiplexing circuit that performs the above described synchronous operation is also called a synchronized AWG.

CITATION LIST

Patent Literature

PTL1: Japanese Patent No. 4100489
PTL2: International Publication 98/36299

Non Patent Literature

NPTL1: "Multimode Interference Couplers for the Conversion and Combining of Zero- and First-order Modes", J. Leuthold, et. al., JOURNAL OF LIGHTWAVE TECHNOLOGY, Vol. 16, pp. 1228-1238, 1998

SUMMARY OF INVENTION

Technical Problems

However, even for the above described synchronized AWG, there is a limitation imposed on increasing the size of a passband. To extend the width of a passband, the intensity ratio of the 1st mode to be combined by the optical mode converter 3109 should be increased, so that the width of a peak displacement along the p axis in the combined optical field can be increased. Here, the intensity ratio of the 1st mode indicates the ratio of the 1st mode power to the sum of the fundamental mode power and the 1st mode power. The position of the peak in the combined optical field is displaced along the p axis, sinusoidally at p=0 according to the optical frequency. Based on the operational principle of the synchronized AWG, the optical center frequency of the optical wavelength multiplexing/demultiplexing circuit corresponds to the optical frequency provided when the peak of the combined optical field is located at position 0 along the p axis.

When the increase in the intensity ratio of the 1st mode is continued, the shape of the combined optical field is gradually deformed from that for the fundamental mode field. The deformation of the field shape is especially noticeable when the peak of the combined optical field is located nearly in the center of the maximum displacement along the p axis (i.e., located near p=0).

The transmittance of the synchronized AWG is determined by the overlap integral of the optical field that enters the first slab waveguide 3101 and by the optical eigen field at the end face, where the second input and output waveguide is connected to the second slab waveguide 3103. The latter optical eigen field is the field for the fundamental mode. Therefore, when the shape of the optical field that enters the first slab waveguide 3101 is displaced and is deformed from the field shape of the fundamental mode, a loss occurs due to mismatching of the fields. When the intensity ratio of the 1st mode is increased, increase of a loss appears near the center (p=0) of the maximum displacement along the p axis in the combined optical field, i.e., near the optical center frequency.

FIG. 25 is a graph showing the transmission spectra of the synchronized AWG, while the intensity ratio of the 1st mode light is employed as a parameter. This shows cases wherein the intensity of the 1st mode is 10%, 20% and 30%. The horizontal axis represents the normalized optical frequency, and 1 is set for the optical frequency channel spacing.

FIG. 26 is an enlarged graph showing the waveform portions of the top ends of the transmission spectrum in FIG. 25. The horizontal axis is enlarged by two, while the vertical axis is enlarged by ten. As is apparent from FIGS. 25 and 26, there is a tendency, as the intensity ratio of the 1st mode is increased, for the width of the passband to be extended. However, on the other hand, a loss is increased near the optical center frequency, and the flatness of the transmittance in the passband disappears.

As described above, for the conventional synchronized AWG, when the width of the passband is extended, an increase of loss can not be avoided near the optical center frequency. When the flatness of the transmittance is to be maintained in the passband, there is a limitation on increasing the width of the passband, and the passband width range of 0.5 dB, which is the transmittance property, is limited to only about 45% of the optical frequency channel spacing. When a network system becomes large and complicated, signal light tends to pass many more points, and accordingly, one signal of light passes many more optical wavelength multiplexing/demultiplexing circuits. In a situation where a number of optical wavelength multiplexing/demultiplexing circuits are connected at many stages, effects produced by the limitation on the width range of the passband would be accumulated. There is another problem in that, because of the above described limitation on the passband width, the synchronized AWG can not be employed for a large complicated communication system, where signal light passes through many more points.

FIG. 27 is a graph showing a transmission spectrum and a group delay spectrum for a conventional AWG, while the intensity ratio of the 1st mode light is employed as a parameter. The group delay spectrum is shown in the optical frequency range wherein the transmittance is equal to or higher than −3 dB for cases wherein the intensity ratio of the 1st mode light is 10%, 20% and 30%. The horizontal axis represents the normalized optical frequency, and 1 is set for the optical frequency channel spacing.

As shown in FIG. 27, the group delay spectrum for the conventional synchronized AWG describes a shape that is not completely flat, even in a passband, and is more or less raised and recessed. When the group delay spectrum for the optical wavelength the multiplexing/demultiplexing circuit is not flat, phase distortion occurs, and deterioration of the transmission quality of the signal light that is passed through the optical wavelength multiplexing/demultiplexing circuit occurs. Even in a case wherein there is only a little quality deterioration by one optical wavelength multiplexing/demultiplexing circuit, the phase distortion of signal light will be accumulated, when a number of such optical wavelength multiplexing/demultiplexing circuits are connected at many stages. Therefore, a conventional problem is that the synchronized AWG can not be employed for a large complicated communication system that includes a number of optical wavelength multiplexing/demultiplexing circuits. Further, no report has been submitted concerning the use of a wide passband synchronized AWG for which a group delay spectrum is completely flat.

The present invention resolves these problems, and one objective of the present invention is to provide a synchronized AWG optical wavelength multiplexing/demultiplexing circuit that, while maintaining the flatness of a passband, increases the width of the passband more than does the conventional art.

Solution to Problems

To achieve this objective, an optical wavelength multiplexing/demultiplexing circuit according to the present invention comprises:

an arrayed-waveguide grating including arrayed waveguides and a first slab waveguide and a second slab waveguide that are respectively connected to the ends of the arrayed waveguides; and a first input and output waveguide optically connected to the first slab waveguide via an interference circuit; and a second input and output waveguide connected to the second slab waveguide, wherein the interference circuit includes
a first arm waveguide,
a second arm waveguide extended adjacent to the first arm waveguide and having a different length,
an optical mode converter which is connected between one ends of the first arm waveguide and the second arm waveguide and an interface of the first slab waveguide, the optical mode converter couples fundamental mode that is received from the first arm waveguide with first mode, and forms an optical field distribution representing a periodical change in a peak position on an interface with the first slab waveguide according to a wavelength, and
an optical splitter, connected to the other ends of the first arm waveguide and the second arm waveguide, wherein an optical frequency spacing for the interference circuit matches an optical frequency channel spacing for the arrayed-waveguide grating, and
a splitting ratio of the optical splitter changes with a spacing that is identical to or half the optical frequency spacing of the interference circuit, and takes a minimum value in the vicinity of an optical center frequency of each channel in the arrayed-waveguide grating. The above described optical waveform multiplexing/demultiplexing circuit is also called a synchronized AWG.

Preferably, the optical splitter can include:
a third arm waveguide and a fourth arm waveguide, between which there is a difference in optical path lengths; and a first-stage optical coupler and a second-stage optical coupler, connected at both ends to terminals of the two arm waveguides.

Further, the first-stage optical splitter and the second-stage optical coupler can also be directional couplers.

Preferably, the optical mode converter can also be a directional coupler that includes two waveguides having dissimilar widths.

Preferably, of the two waveguides in the directional coupler, the width of the narrower waveguide can be gradually reduced from the side of the first arm waveguide, and the narrower waveguide terminated at a point a specified width is reached.

Preferably, of the two waveguides in the directional coupler, the narrower waveguide may be terminated at a predetermined location by a groove into which a light blocking material has been filled to attenuate light.

Preferably, the optical mode converter can include two multimode interference circuits cascaded in a direction in which light travels.

According to another aspect of the present invention, the optical wavelength multiplexing/demultiplexing circuit further comprises:

a first groove, which is formed at least across either of the arrayed waveguides, the first slab waveguide or the second slab waveguide, and the first groove is filled with a material which has a temperature coefficient of a refractive index that is different from a temperature coefficient of an effective refractive index for the waveguide where the first groove is formed, so that temperature dependence of the optical center frequency of the arrayed-waveguide grating can be compensated for;

a second groove, which is formed in at least a longer one of either the first arm waveguide or the second arm waveguide, and the second groove is filled with a material which has a temperature coefficient of a refractive index that differs from a temperature coefficient of an effective refractive index for the waveguide wherein the second groove is formed, so that temperature dependence of a difference in optical path lengths of the first arm waveguide and the second arm waveguide can be compensated for;

a third groove, which is formed in at least a longer one of either the third arm waveguide or the fourth arm waveguide, and the third groove is filled with a material which has a temperature coefficient of a refractive index that differs from a temperature coefficient of an effective refractive index for the waveguide wherein the third groove is formed, so that temperature dependence of a difference in optical path lengths of the third arm waveguide and the fourth arm waveguide can be compensated for.

Preferably, at least one of the first groove, the second groove and the third groove is divided into a plurality of groove segments in the direction in which light travels.

The optical wavelength multiplexing/demultiplexing circuit of the present invention can also be applied for an optical module. Specifically, an optical module according to another embodiment of the present invention comprises:

at least one first type of optical wavelength multiplexing/demultiplexing circuit, as described above; and a second type of optical wavelength multiplexing/demultiplexing circuit, prepared equivalent in number to the first type, which has a transmission spectrum with the same shape as a transmission spectrum for the first type of optical wavelength multiplexing/demultiplexing circuit, and a group delay spectrum with an inverted shape of a group delay spectrum of the first type of optical waveform multiplexing/demultiplexing circuit along a group delay time axis, wherein the second type of optical wavelength multiplexing/demultiplexing circuit is configured to have an inverted value in optical path lengths difference between the first arm waveguide and the second arm waveguide of the first type of optical wavelength multiplexing/demultiplexing circuit, and further configured to have an inverted value in optical path lengths difference between the third arm waveguide and the fourth arm waveguide of the first type of optical wavelength multiplexing/demultiplexing circuit. Here, the group delay spectrum having the inverted shape includes, along the time axis of the group delay, a group delay spectrum that is inverted, while a constant group delay line that indicates a constant group delay is employed as the axis of line symmetry.

Furthermore, an optical module according to still another aspect of the present invention comprises:

at least one first type of optical wavelength multiplexing/demultiplexing circuit, as described above; and a second type of optical wavelength multiplexing/demultiplexing circuit, prepared equivalent in number to the first type, which has a transmission spectrum with the same shape as a transmission spectrum of the first type of optical wavelength multiplexing/demultiplexing circuit, and a group delay spectrum with an inverted shape of the group delay spectrum of the first type of optical wavelength multiplexing/demultiplexing circuit long a group delay time axis, wherein the second type of optical wavelength multiplexing/demultiplexing circuit is configured with respect to the first type of optical wavelength multiplexing/demultiplexing circuit such that, connections of the first input and output waveguide to two input terminals of the first-stage optical coupler are reversed, a half wavelength optical path is added to an optical path lengths difference between the first arm waveguide and the second arm waveguide, connections of the first arm waveguide and the second arm waveguide to two terminals of the optical mode converter are reversed, and the optical mode converter is inversely located so as to be symmetrical along the incident axis. Here, the group delay spectrum having the inverted shape includes a group delay spectrum that is inverted along the group delay time axis, while a constant group delay line, which indicates a constant group delay, is employed as the axis of line symmetry.

Further, almost needless to say, the optical wavelength multiplexing/demultiplexing circuit and the optical module of the present invention can be expanded for an optical communication system. Specifically, the first type of optical wavelength multiplexing/demultiplexing circuits and the same number of the second type of optical wavelength multiplexing/demultiplexing circuits can be arranged in the same transmission section of an optical communication network. And when the two types of AWGs, i.e., the first type and the second type of optical wavelength multiplexing/demultiplexing circuits are employed together, a flat group delay characteristic can be obtained.

Advantageous Effects of Invention

As described above, the present invention can resolve the problem occasioned by the limited passband width of a conventional, synchronized AWG. A further capability is that two conditions requested for a passband, flatness and broadness, can be satisfied. And furthermore, a temperature-compensated optical wavelength multiplexing/demultiplexing circuit can be provided. Also, an optical wavelength multiplexing/demultiplexing circuit can be provided that can even be appropriately employed for an optical communication system wherein each optical signal passes many points. And in addition, when the optical wavelength multiplexing/demultiplexing circuits of the present invention, for which a group delay spectrum is inverted along the group delay time axis, are paired and employed together, the group delay spectrum can be flattened, and an optical communication system can be configured for which there is less transmission quality deterioration.

BRIEF DESCRIPTION OF DRAWINGS

FIG. 1 represents the arrangement of an optical wavelength multiplexing/demultiplexing circuit for the present invention, with (a) being a diagram for the general arrangement, and (b) being an enlarged diagram for the vicinity of the boundary between an optical mode converter and a first slab waveguide;

FIG. 30 is a diagram illustrating a second arrangement for an optical wavelength multiplexing/demultiplexing circuit according to the third example;

DESCRIPTION OF EMBODIMENTS

Figure 2:
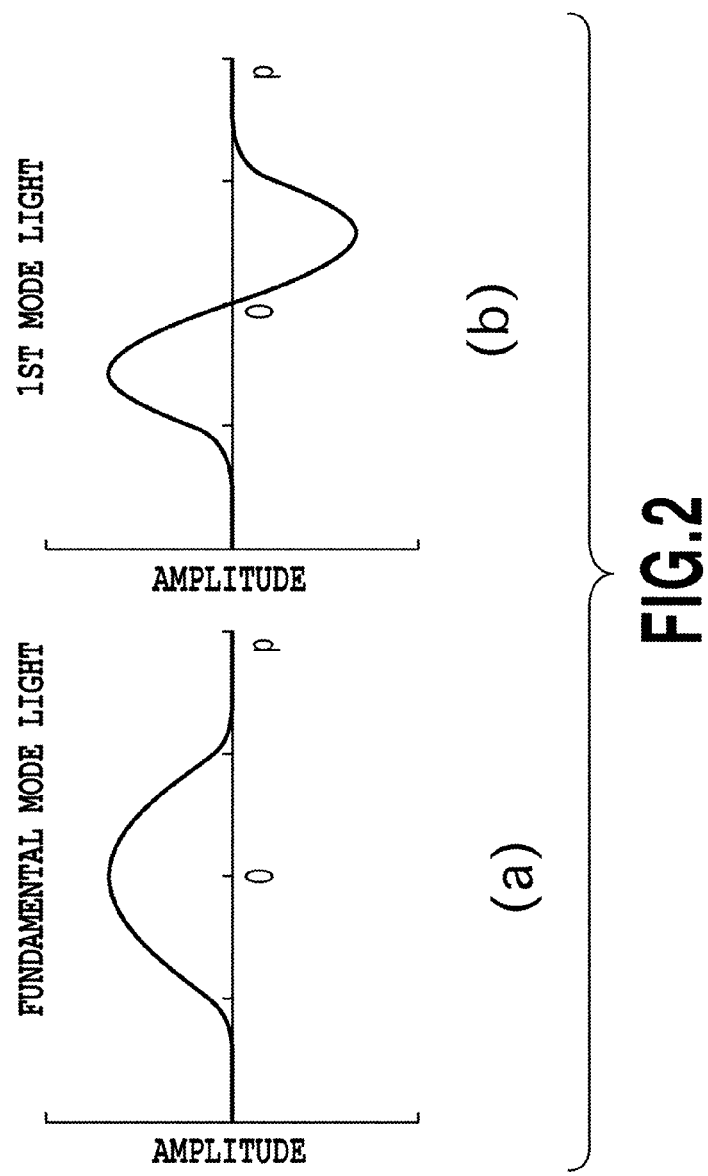
FIG. 2 represents an optical field distribution formed at the interface where the optical mode converter and the first slab waveguide are connected, with (a) showing a fundamental mode and (b) showing a 1st mode.

As previously described, for a synchronized AWG optical wavelength multiplexing/demultiplexing circuit, an optical field provided by combining the fundamental mode light and the 1st mode is displaced and deformed from the field for the fundamental mode as the intensity ratio of the 1st mode light is increased. The inventors of the present invention noticed that the degree of deformation is especially remarkable when the peak of the combined optical field is positioned near the center of displacement (p=0). That is, when the intensity ratio of the 1st mode light is modulated in accordance with the optical frequency, the minimum value can be set for the intensity ratio at the peak of the combined optical field that is positioned near the center of displacement. As a result, deformation of the combined optical field can be suppressed, and the increase in loss near the optical center frequency can be reduced. For the present invention, the optical splitter of the interference circuit is focused on. When the optical splitter includes a mechanism that employs the optical frequency to cyclically change the splitting ratio of two outputs by the optical splitter, the intensity ratio of the 1st mode light can be changed. The configuration and the operation of the optical wavelength multiplexing/demultiplexing circuit of the present invention will now be described in detail.

The optical wavelength multiplexing/demultiplexing circuit of the present invention is a synchronized AWG, wherein an optical splitter is arranged in an interference circuit connected to one of slab waveguides, and the splitting ratio of the two outputs changes in accordance with the optical frequency and becomes the minimum value near the optical center frequency of the synchronized AWG. The optical splitter is operated so that the splitting ratio becomes comparatively great when the optical frequency is deviated distant from the optical center frequency. The spacing of a change in the splitting ratio of the optical splitter can be employed as the optical frequency obtained by dividing, by a natural number (1, 2, . . . ), the optical frequency channel spacing of the synchronized AWG. Since there is a request that the splitting ratio be as small as possible near the optical center frequency, a natural number is preferably 1 or 2. That is, it is preferable that the periodic change in the splitting ratio of the optical splitter be equal to, or half of the optical frequency channel spacing of the synchronized AWG.

(a) in FIG. 1 is a diagram showing the arrangement of the optical wavelength multiplexing/demultiplexing circuit of the present invention. An optical multiplexing/demultiplexing circuit 100 includes a first slab waveguide 101, arrayed waveguides 102, a second slab waveguide 103, a second input and output waveguide 104 and a first input and output waveguide 105. An optical splitter 106, a first arm waveguide 107, a second arm waveguide 108 and an optical mode converter 109, all of which constitute an interference circuit, are sequentially connected between the first input and output waveguide 105 and the first slab waveguide 101. In the optical wavelength multiplexing/demultiplexing circuit of the present invention, the splitting ratio of the optical splitter 106 periodically changes in accordance with the optical frequency.

(b) in FIG. 1 is an enlarged diagram showing a portion B near the boundary between the optical mode converter and the first slab waveguide. The optical mode converter 109 provides, at the interface connected to the first slab waveguide, an optical field for light obtained by combining the fundamental mode and the 1st mode. As previously described, the position of the peak of the combined optical field is displaced, along the p axis that contacts the connected interface, to either the positive or negative side at p=0.

FIG. 2 is a diagram showing an example optical field distribution for each mode that is generated on the interface where the optical mode converter and the first slab waveguide are connected. (a) is an example field distribution for the fundamental mode light and (b) is an example field distribution for the 1st mode light, both of which are formed at the interface where the optical mode converter 109 and the first slab waveguide 101 are connected. The horizontal axis corresponds to the p coordinate axis in FIG. 1, and the center position of the optical mode converter 109 is employed as p=0.

Figure 3:
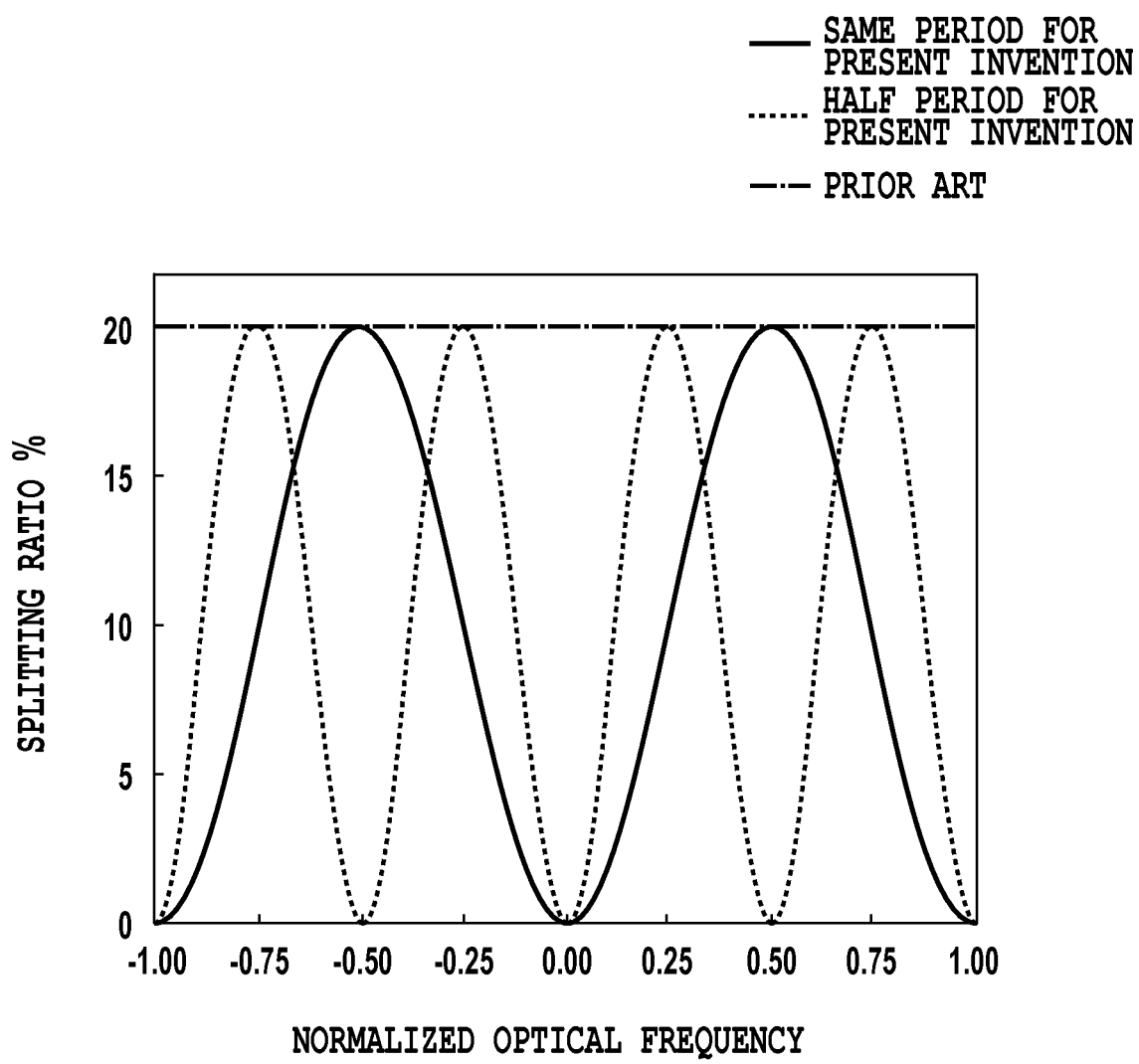
FIG. 3 is a graph showing a change in the splitting ratio of the optical splitter in the optical wavelength multiplexing/demultiplexing circuit of the present invention.

FIG. 3 is a graph showing an example change for the splitting ratio of the optical splitter for the optical wavelength multiplexing/demultiplexing circuit of the present invention. The horizontal axis represents an optical frequency that is normalized by employing a specific optical frequency as "0" and an optical frequency channel spacing of "1". The vertical axis represents the splitting ratio employing an antilogarithm (%). In this case, the splitting ratio is a ratio, relative to the whole light power, of the power of light to be split and guided to the first arm waveguide 107. The change in a transmittance is depicted using an example cosine curve that changes within a range of 0 to 20%. A solid line indicates a case wherein the spacing of a change of the splitting ratio is equal to the optical frequency channel spacing, and a dotted line indicates a case wherein the spacing of a change of the splitting ratio is half of the optical frequency channel spacing. As a comparison, a long dash-dot line indicates a case of an optical splitter employed for a conventional synchronized AWG, showing a constant splitting ratio of 20%.

Figure 4:
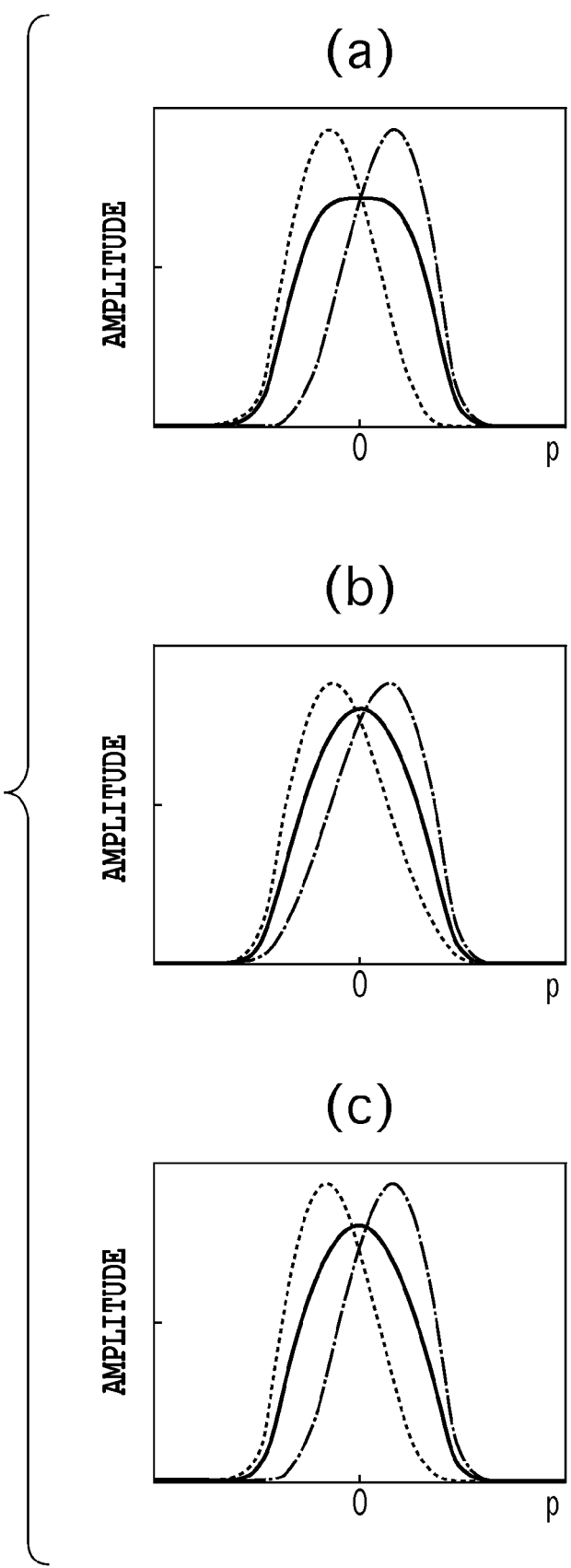
FIG. 4 is a graph showing (a), (b) and (c), each of which indicates a change in an optical frequency that occurred in a combined optical field distribution when transmittance was changed by the optical splitter.

FIG. 4 is a graph showing a change, relative to the optical frequency, that appeared in the distribution of the optical field for the two combined modes when the change in the splitting ratio of the optical splitter was applied. That is, a change that appeared, relative to the optical frequency, in the distribution of the combined optical field for the two modes shown in FIG. 2 is depicted for individual cases wherein the changes in the splitting ratio shown in FIG. 3 were applied. In FIG. 4, (a) shows a case wherein a conventional synchronized AWG has the constant splitting ratio of 20%, (b) shows a case wherein the spacing of a change in the splitting ratio for the optical splitter is equal to an optical frequency channel spacing, and (c) shows a case wherein the spacing of a change in the splitting ratio for the optical splitter is half of an optical frequency channel spacing. These cases represent a distribution indicated by a solid line, for a case wherein the peak of the combined optical field is positioned in the center (p=0), and distributions indicated by two types of broken lines, for a case wherein the peak of the combined optical field is located at the maximum displacement position, separated from and furthest from the center.

As is apparent from (a) in FIG. 4, for the combined optical field of the conventional synchronized AWG, when the peak of the combined optical field is positioned near the center (p=0), the peak portion of a field profile is compressed, and deformation by the optical field for the fundamental mode is observed. This is affected by the 1st mode that has been coupled by the optical mode converter. Due to the deformation of the combined optical field, a loss tends to be increased near the optical center frequency of the synchronized AWG. Therefore, when an optical wavelength multiplexing/demultiplexing circuit that includes the conventional synchronized AWG is employed to obtain flat transmission characteristics, the intensity ratio should be properly reduced for the 1st mode that is to be coupled by the optical mode converter.

According to the present invention, however, even in cases (b) and (c) in FIG. 4, wherein the peak of the combined optical field is positioned near the center (p=0), the combined optical field provided by the optical mode converter that includes the optical field is not displaced from the optical field for the fundamental mode, or deformed. This is because, when the combined optical field is positioned near the center (p=0) along the p axis, the splitting ratio for the optical splitter 106 is changed, and the intensity of a light wave to be coupled as the 1st mode light becomes almost zero. Since the splitting ratio of the optical splitter 106 is changed, an increase in loss can be suppressed, even near the optical center frequency of the synchronized AWG. As a whole, flatness of the passband can be obtained while the intensity ratio of the 1st mode light to be coupled is increased, so that a large passband width and flatness can be obtained. More specific examples for the present invention will now be described in detail.

EXAMPLE 1

An optical wavelength multiplexing/demultiplexing circuit according to a first example of the present invention corresponds to a synchronized AWG for a case wherein the splitting ratio of an optical splitter is changed in the same spacing as an optical frequency channel spacing.

Figure 5:
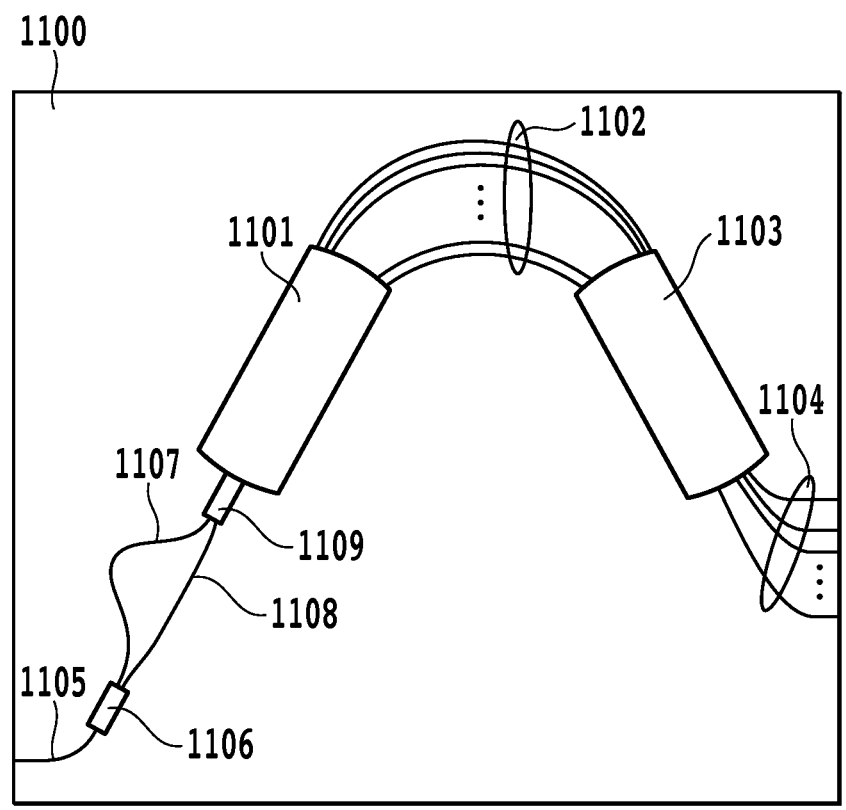
FIG. 5 is a diagram illustrating the arrangement of an optical wavelength multiplexing/demultiplexing circuit according to a first example of the present invention.

FIG. 5 is a plan view of the arrangement of the synchronized AWG type optical wavelength multiplexing/demultiplexing circuit of this example. An optical wavelength multiplexing/demultiplexing circuit 1100 includes a first slab waveguide 1101, arrayed waveguides 1102, a second slab waveguide 1103, second input and output waveguides 1104 and a first input and output waveguide 1105. An optical splitter 1106, a first arm waveguide 1107, a second arm waveguide 1108 and an optical mode converter 1109 are sequentially connected between the first input and output waveguide 1105 and the first slab waveguide 1101. The splitting ratio of the optical splitter 1106 periodically changes in accordance with the optical frequency.

The individual components will now be described in detail. For the optical wavelength multiplexing/demultiplexing circuit 1100, a relative index difference Δ for waveguides is 1.5% and the core thickness is 4.5 μm. The widths of the arrayed waveguide 1102, the second input and output waveguides 1104, the first input and output waveguide 1105, the first arm waveguide 1107 and the second arm waveguide 1108 are 4.5 μm. Further, the lengths of the first slab waveguide 1101 and the second slab waveguide 1103 are 7600 μm.

For the second input and output waveguides 1104, a number of waveguides equivalent to a number of wavelength channels are arranged at an interval of 15 μm at the portion that is connected to the second slab waveguide 1103. A linear tapered waveguide having an opening width of 12 μm is arranged at the terminal ends of the second input and output waveguides 1104, near the second slab waveguide. Further, for the optical wavelength multiplexing/demultiplexing circuit 1100, 400 wavelength channels are set, the optical frequency channel spacing is set to 100 GHz and the optical frequency of the center channel (the 21st channel) is set to 194.1 THz. 200 waveguides are employed for the arrayed waveguides 1102, and a difference in length between the adjacent arrayed waveguides is 33.9 µm. A difference in length between the first arm waveguide 1107 and the second arm waveguide 1108 is 2020 µm.

Figure 6:
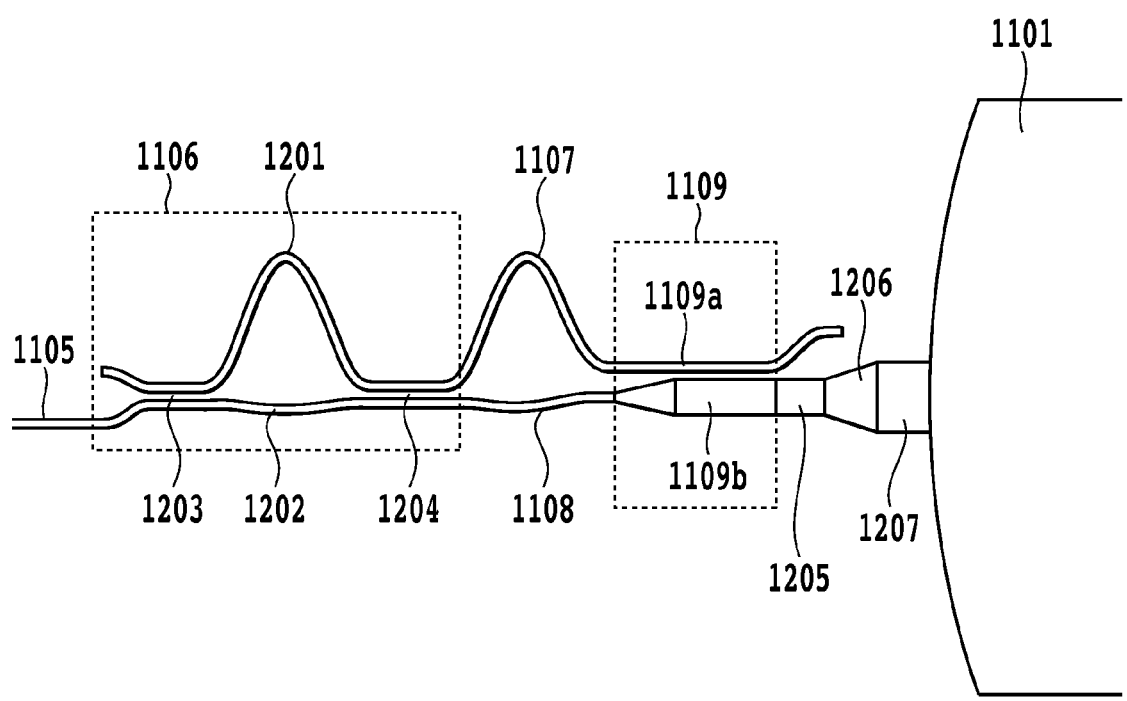
FIG. 6 is an enlarged plan view of a portion of the optical wavelength multiplexing/demultiplexing circuit for the first example, extending from an optical splitter to a first slab waveguide.

FIG. 6 is an enlarged plan view of the portion of the optical wavelength multiplexing/demultiplexing circuit in this example, from the optical splitter 1106 to the first slab waveguide 1101. The structures of the individual components will be more specifically described.

The optical splitter 1106 includes a third arm waveguide 1201, a fourth arm waveguide 1202, a directional coupler 1203 that serves as a 1st optical splitter, and a directional coupler 1204 that serves as a 2nd optical coupler. The optical mode converter 1109 includes directional couplers, the waveguide widths of which are mutually asymmetric. A waveguide 1109a and a waveguide 1109b are respectively connected to a first arm waveguide 1107 and a second arm waveguide 1108. The width of the waveguide 1109a is 2.5 µm, while the width of the waveguide 1109b is 8 µm, and the length of both waveguides is 500 µm. The effective refractive index of the fundamental mode light for the waveguide 1109a substantially matches the effective refractive index of the 1st mode light for the waveguide 1109b. Therefore, about 100% of the light that has entered the waveguide 1109a is coupled with the 1st mode in the waveguide 1109b, so that the optical mode coupling function is provided. The waveguide 1109b is further connected to multimode waveguides 1204 and 1206. A tapered waveguide 1205 is arranged between the two multimode waveguides 1204 and 1206. The width of the waveguide 1206, connected to the first slab waveguide 1101, is set to 17 µm.

In the optical splitter 1106, a difference in length between the third arm waveguide 1201 and the fourth arm waveguide 1202 is 2020 µm. The coupling ratio of the directional coupler 1203 is set to 2.5%, and the coupling ratio of the directional coupler 1204 is set to 10%.

Figure 7:
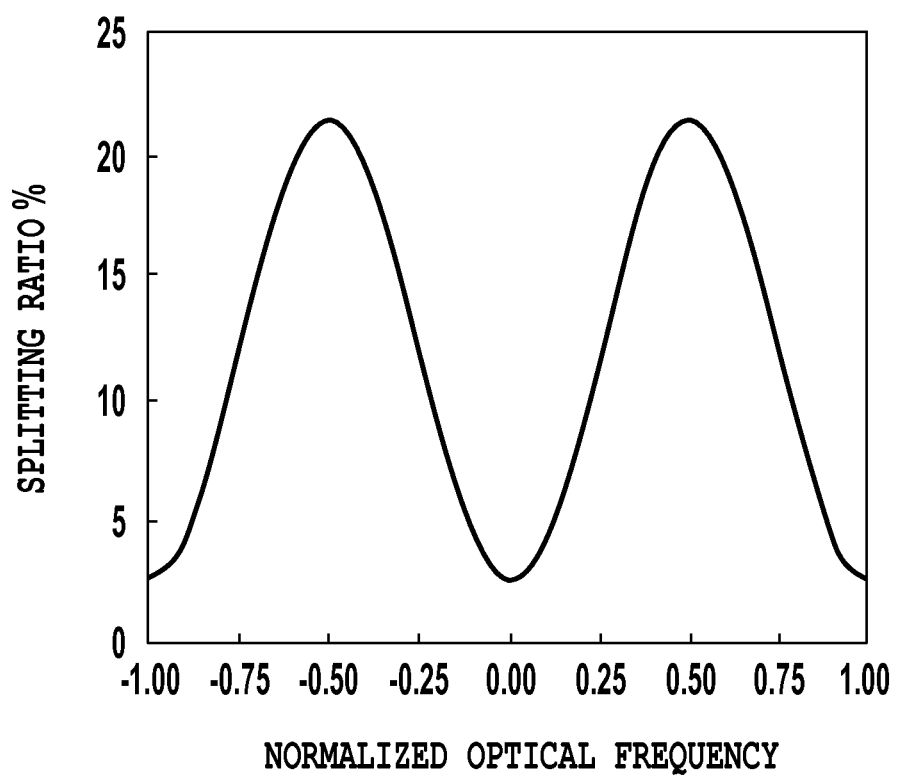
FIG. 7 is a graph showing a change in the transmittance of the optical attenuator in the optical wavelength multiplexing/demultiplexing circuit for the first example.

FIG. 7 is a graph showing a change in the splitting ratio of the optical splitter of the optical wavelength multiplexing/demultiplexing circuit of this example. The horizontal axis represents a normalized optical frequency by employing the optical center frequency of "0" for a specific channel and an optical frequency channel spacing of "1". The splitting ratio here indicates a ratio, relative to the whole light power, of a light power that is split and guided to the first arm waveguide 1107. In this example, the splitting ratio of the optical splitter 1106 ranges from 3% to 21%, and varies in concert with the same spacing as the optical frequency channel spacing. That is, the splitting ratio of the optical splitter 1106 is changed in accordance with the optical frequency, and reaches the minimum value 3% near the optical center frequency of the synchronized AWG. It should also be noted that the splitting ratio is comparatively increased at an optical frequency far from that of the optical center frequency.

Figure 8:
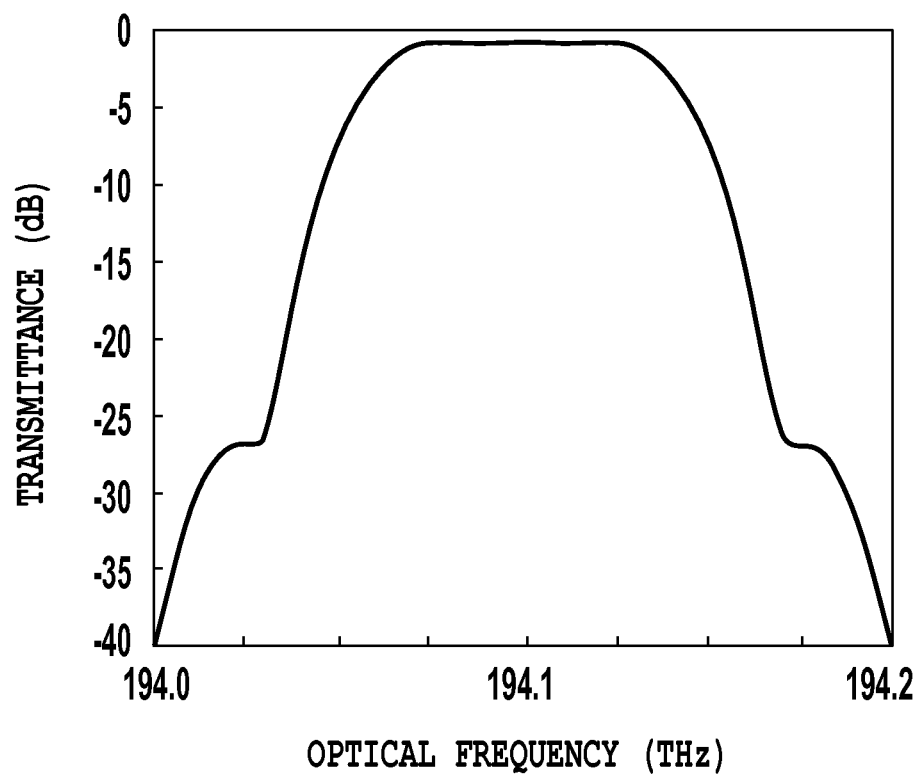
FIG. 8 is a graph showing the waveform of a transmission spectrum for the optical wavelength multiplexing/demultiplexing circuit of the first example.

FIG. 8 is a graph showing the waveform of a transmission spectrum of the center channel (the 21st channel) of the optical wavelength multiplexing/demultiplexing circuit of this example. The horizontal axis represents an optical frequency (THz), and the vertical axis represents a transmittance of dB.

Figure 9:
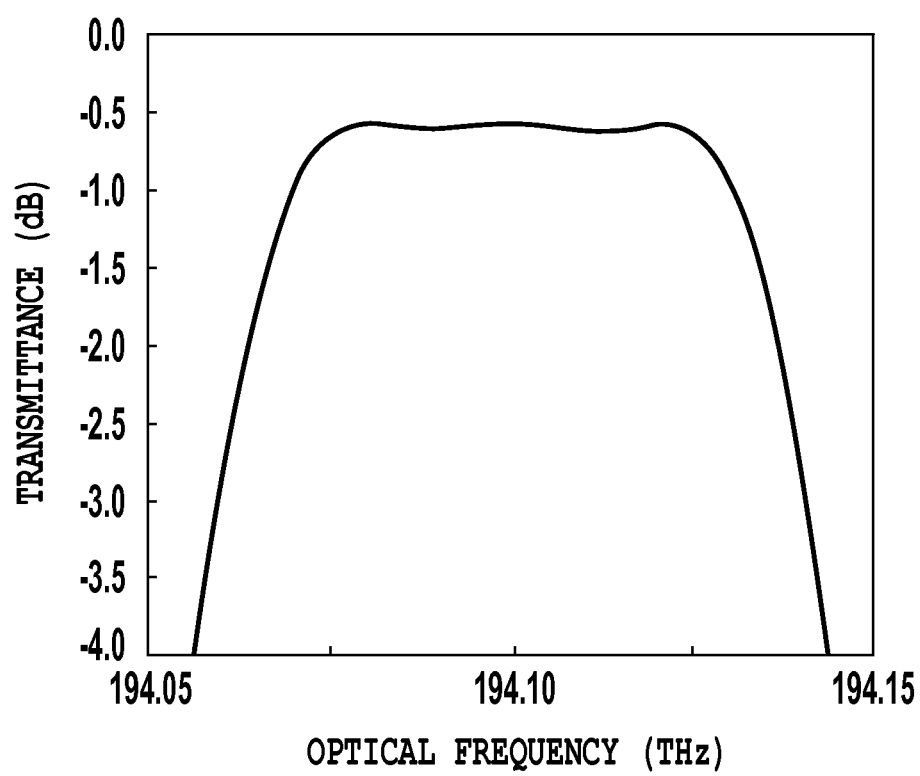
FIG. 9 is an enlarged graph showing the portion near the tip of the waveform of the transmission spectrum shown in FIG. 8.

FIG. 9 is an enlarged graph showing the tip waveform portion of the transmission spectrum shown in FIG. 8. The horizontal axis is enlarged by two and the vertical axis is enlarged by ten. As is apparent from FIGS. 8 and 9, compared with the conventional art, the optical wavelength multiplexing/demultiplexing circuit of this example provides the increase in the passband while maintaining the flatness of the passband. In this example, the passband of 0.5 dB is 64 GHz, which is 64% of the optical frequency channel spacing (100 GHz). Compared with the conventional art, for which the maximum passband of 0.5 dB is limited to only about 45% of the optical frequency channel spacing, the passband is increased by 19%.

In this example, as shown in FIG. 6, directional couplers whose waveguide widths are mutually asymmetric are employed to form the optical mode converter 1109. A method for providing the optical mode converter 1109 is not limited to the use of this structure, and various other methods can be employed.

Figure 10:
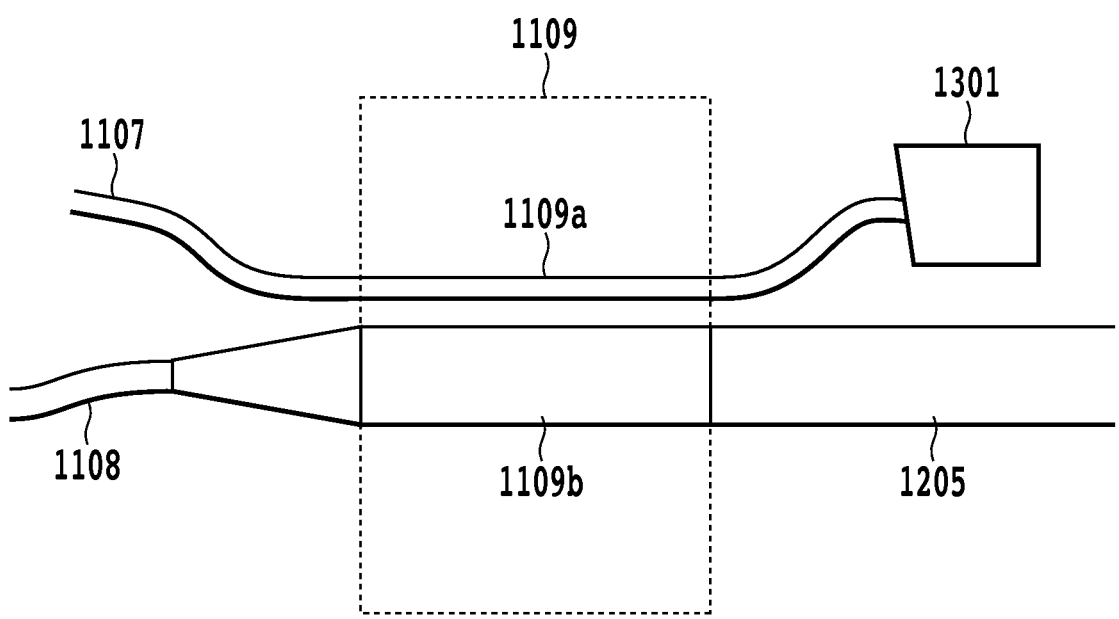
FIG. 10 is an enlarged diagram illustrating another arrangement for the vicinity of the optical mode converter.

FIG. 10 is an enlarged diagram illustrating another arrangement of the vicinity of the optical mode converter. As well as the arrangement in FIG. 6, the arrangement in FIG. 10 includes an asymmetric directional coupler. However, a difference from the arrangement in FIG. 6 is that one waveguide 1109a is terminated at a groove 1301 via an output waveguide. A light blocking material for absorbing light is filled into the groove 1301, and the interface of the light blocking material and the output waveguide is not perpendicular to the waveguide, but is inclined at eight degrees from the perpendicular plane. Compared with the arrangement in FIG. 6, this arrangement can block a small amount of light that still remains instead of being guided from the waveguide 1109a to the waveguide 1109b. Since the entry of stray light into the first slab waveguide 1101, etc., can be suppressed and light again reflected toward the output waveguide can also be reduced, this arrangement is characterized by providing an optical wavelength multiplexing/demultiplexing circuit that has superior crosstalk and reflection properties.

Figure 11:
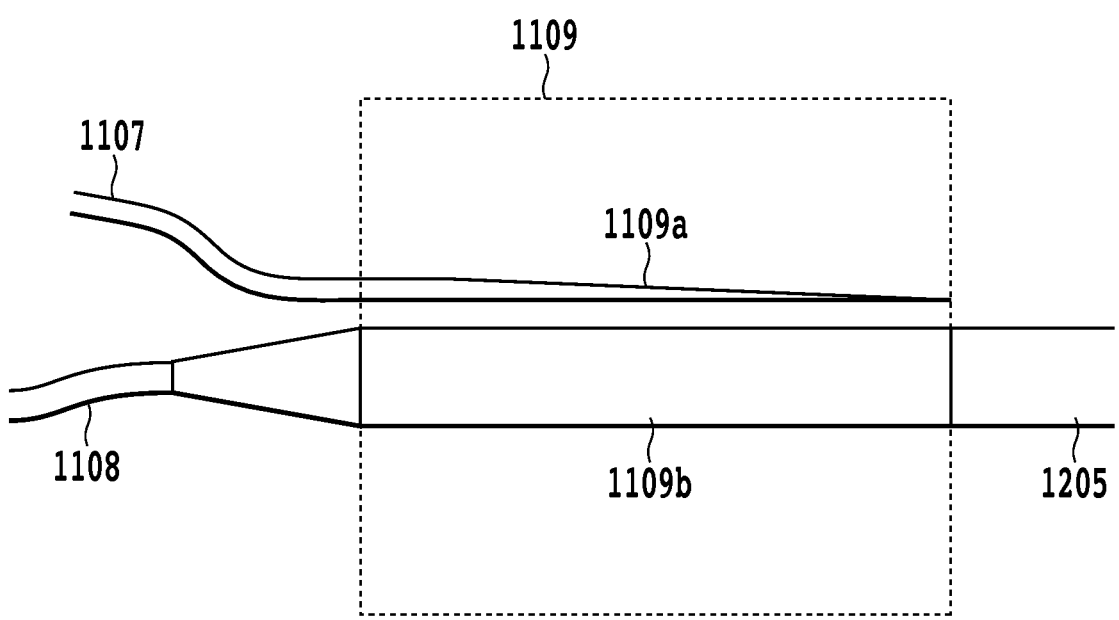
FIG. 11 is an enlarged diagram illustrating still another arrangement for the vicinity of the optical mode converter.

FIG. 11 is an enlarged diagram illustrating still another arrangement for the vicinity of the optical mode converter. As well as the arrangement in FIG. 6, this arrangement includes an asymmetric directional coupler. A difference from the arrangement in FIG. 6 is that the width of a waveguide 1109a is gradually reduced, and is terminated at a width of 0. The length for the waveguides 1109a and 1109b is set to 1500 µm. According to this arrangement compared with the arrangement in FIG. 6, the ratio of the coupling of a light wave from the waveguide 1109a to the waveguide 1109b can be nearer 100%, so that an optical wavelength multiplexing/demultiplexing circuit having a truly superior loss property can be provided.

Figure 12:
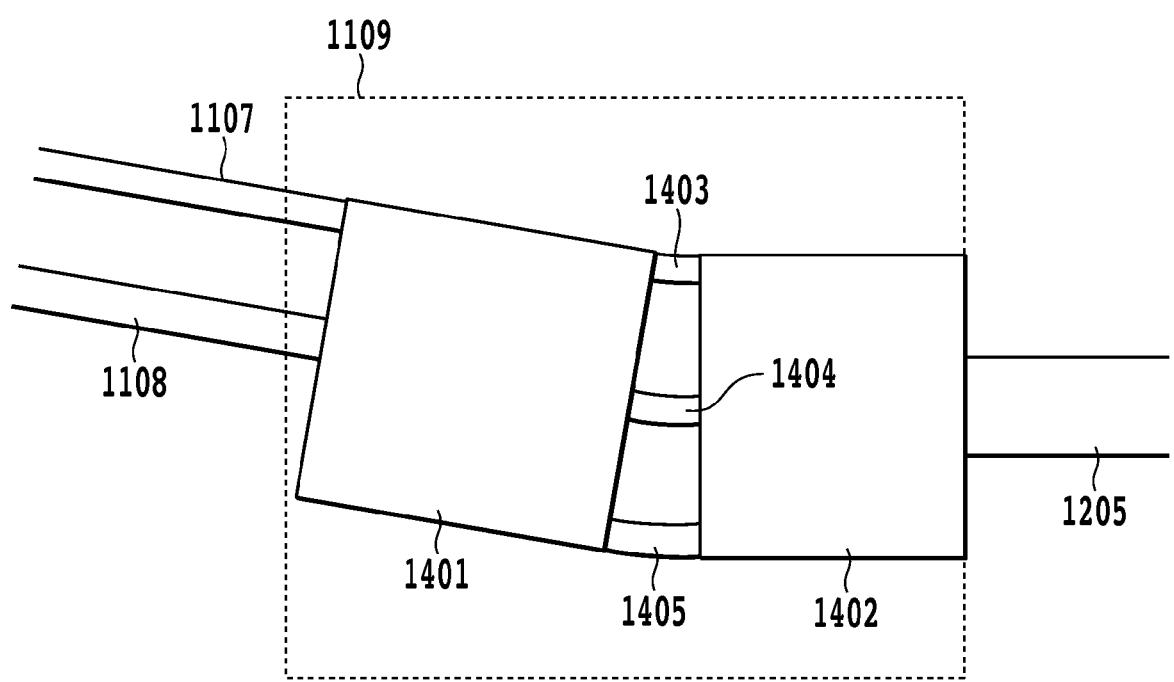
FIG. 12 is an enlarged diagram illustrating yet another arrangement for the vicinity of the optical mode converter.

FIG. 12 is an enlarged diagram illustrating yet another arrangement for the vicinity of the optical mode converter. In this arrangement, the optical mode converter 1109 includes two multimode interference (MMI) circuits. This structure is described in detail in non patent literature 1. The optical mode converter 1109 includes a first MMI circuit 1401, a second MMI circuit 1402 and center waveguides 1403, 1404 and 1405. The first MMI circuit 1401 is 20 µm wide and 754 µm long, and the second MMI circuit 1402 is 20 µm wide and 377 µm long. The center waveguide 1403 is 4.5 µm wide and 50 µm long, the center waveguide 1404 is 4.5 µm wide and 51.5 µm, and the center waveguide 1405 is 4.5 µm wide and 53 µm long.

Generally, when the MMI circuit is compared with the directional coupler, a change in the splitting ratio is small, relative to a variation in the waveguide width. Therefore, even when there is a manufacturing variation in the width of a waveguide, the coupling ratio at which the fundamental mode light that has entered from the arm waveguide 1407 is to be coupled to the 1st mode light on the multimode waveguide 1205 is less affected in this arrangement than in the arrangement in FIG. 6. As a result, it is possible to provide an optical wavelength multiplexing/demultiplexing circuit that delivers superior productivity with a more relaxed fabrication tolerance.

Figure 13:
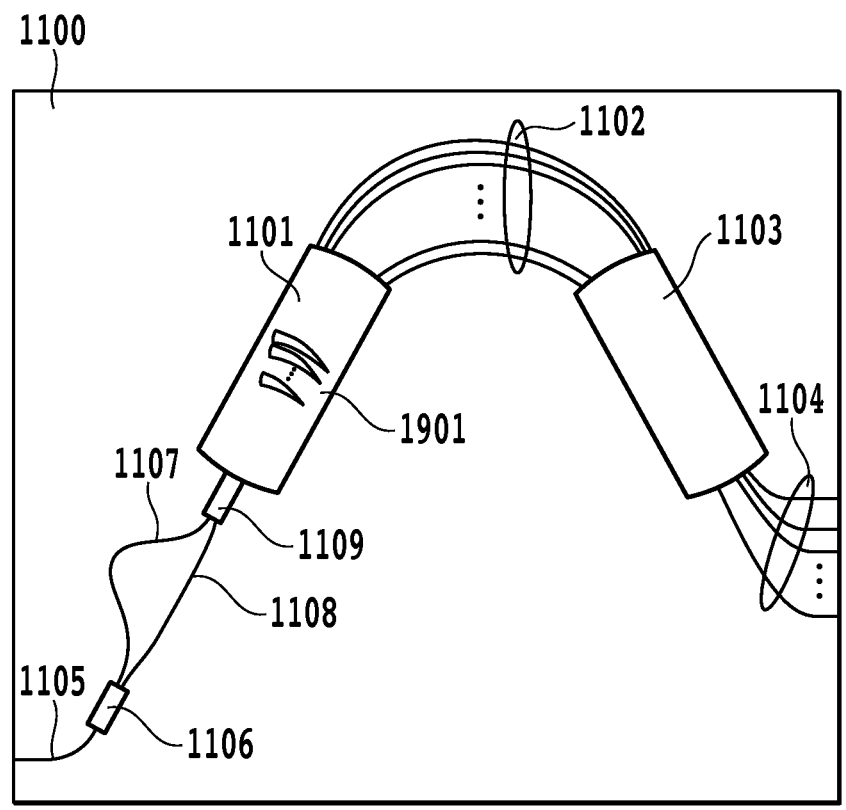
FIG. 13 is a diagram illustrating another example arrangement for the optical wavelength multiplexing/demultiplexing circuit shown in FIG. 5, wherein temperature dependence of a transmission wavelength is suppressed.

FIG. 13 is a diagram illustrating the structure for an example, wherein the temperature dependence of the center frequency is more suppressed for the optical wavelength multiplexing/demultiplexing circuit in FIG. 5. An explanation will be given for grooves formed in a slab waveguide, which is a different structure from that shown in FIG. 5. A method for suppressing the temperature dependence of a transmission wavelength of an AWG, etc., is disclosed in patent literature 2.

Figure 14:
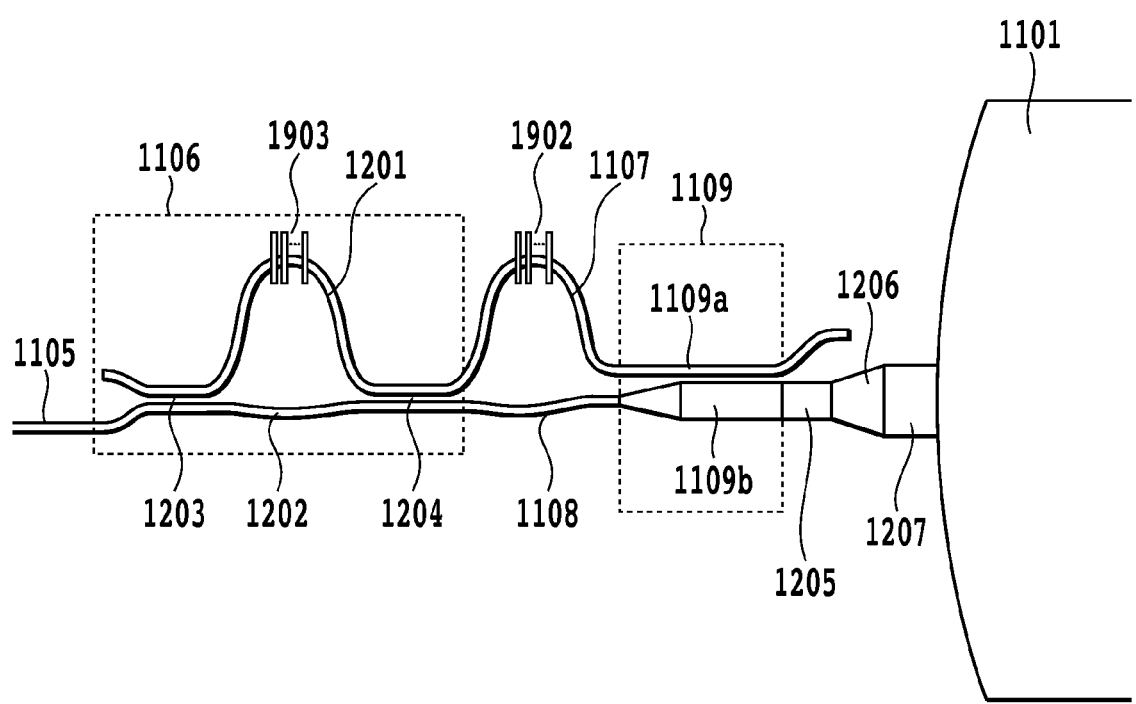
FIG. 14 is an enlarged diagram showing a portion of the example wherein dependence on temperature is suppressed, that extends from the optical splitter to the first slab waveguide.

FIG. 14 is an enlarged diagram showing the portion of the arrangement with suppressed temperature dependence for this example, extending from the optical splitter to the first slab waveguide. An explanation will also be given for grooves formed in arm waveguides that are different from the arrangement in FIG. 6.

Referring to FIG. 13, grooves 1901 are formed in the first slab waveguide 1101 so as to cut off the waveguide. Further, referring to FIG. 14, grooves 1902 and 1903 are formed to cut off the first arm waveguide 1107 and the third arm waveguide 1201. A material (a temperature compensation material), for which a temperature coefficient of a refractive index differs from a temperature coefficient of the effective refractive index of the waveguide, is filled into all of the grooves.

The grooves 1901 in FIG. 13 are formed in a curved triangular shape, so that the groove width is changed in accordance with the wavelength of a light wave. More specifically, when $W_1$ denotes the width of a groove, across which the light wave passes and is propagated in the first slab waveguide 1101 so as to enter one of the arrayed waveguides 1102, and $W_2$ denotes the width of a groove across which the light wave passes in the first slab waveguide 1101 and enters the other waveguide, in the arrayed waveguides 1102, that is located immediately outside the previously described waveguide, a difference between $W_1$ and $W_2$ satisfies a relationship represented by the following expression.

$$W_1 - W_2 = -\alpha/\alpha' \times \Delta L \qquad \text{Ex. (1)}$$

In this case, $\Delta L$ represents a difference in length between arrayed, adjacent waveguides, $\alpha$ represents the temperature coefficient of the effective refractive index for the arrayed waveguides, and $\alpha'$ represents the temperature coefficient of the refractive index for the temperature compensation material to be filled. The grooves 1901 are located at eight separate places to reduce, to the extent possible, diffraction loss, in the groove, of a light wave. It should be noted that the grooves 1901 are provided so that the sum of the widths of these separate grooves satisfies the condition in expression (1).

The grooves 1902 in FIG. 14 have a width that establishes $-\alpha/\alpha' \cdot \Delta l_1$. Here, $\Delta l_1$ indicates a difference in length of the first arm waveguide 1107 relative to the second arm waveguide 1108. The grooves 1903 in FIG. 14 have a width that establishes $-\alpha/\alpha' \cdot \Delta l_2$. Here, $\Delta l_2$ indicates a difference in length of the third arm waveguide 1201 relative to the fourth arm waveguide 1202. The grooves 1902 and the grooves 1903 are arranged at six separate locations, in order to reduce, to the extent possible, the diffraction loss, in the grooves, by a light wave.

A transparent material that is easy to fill into the groove is preferable as a temperature compensation material. Furthermore, as the width of each groove is reduced, suppression of the diffraction loss by a light wave can be increased. From this viewpoint, it is preferable that the absolute value for $\alpha'$ be as great as possible, and that the sign of the value be the reverse of that for $\alpha$. In a case wherein silica-based waveguide material ($\alpha=1\times10^{-5}$ [$°$ C.$^{-1}$] is used, a silicone resin ($\alpha'=-3.5\times10^{-4}$ [$°$ C.$^{-1}$]), for example, can be employed as a preferable temperature compensation material.

In the above described embodiment, an arrangement has been described wherein grooves are formed in the first slab waveguide and a temperature compensation material is employed to fill them; however, the present invention is not limited to this arrangement. Specifically, the same effects can be obtained for an arrangement wherein grooves are formed in the second slab waveguide, an arrangement wherein grooves are formed in an arrayed waveguide, or an arrangement wherein grooves are formed in all of these portions.

As described above, according to the optical wavelength multiplexing/demultiplexing circuit of this example, an increase in a loss can also be suppressed in the vicinity of the optical center frequency of the synchronized AWG. The flatness of the entire passband can be obtained, while the intensity ratio of the 1st mode light to be combined is increased. Therefore, the temperature-compensated optical wavelength multiplexing/demultiplexing circuit, for which a wide passband width and flatness are established, can be obtained.

EXAMPLE 2

An optical wavelength multiplexing/demultiplexing circuit, according to a second example of the present invention, corresponds to a case wherein the splitting ratio of the optical splitter included in a synchronized AWG is changed in accordance with a spacing equivalent to half that of an optical frequency channel spacing.

Figure 15:
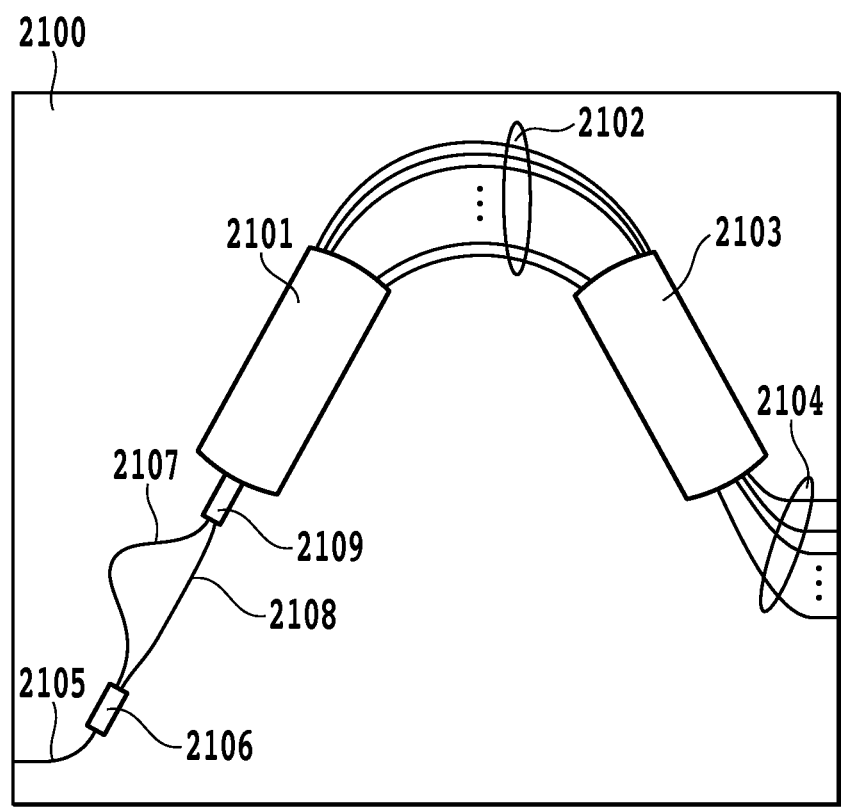
FIG. 15 is a diagram illustrating the arrangement of an optical wavelength multiplexing/demultiplexing circuit according to a second example of the present invention.

FIG. 15 is a plan view of the arrangement of the synchronized AWG type optical wavelength multiplexing/demultiplexing circuit of this example. An optical wavelength multiplexing/demultiplexing circuit 2100 includes a first slab waveguide 2101, arrayed waveguides 2102, a second slab waveguide 2103, second input and output waveguides 2104 and a first input and output waveguide 2105. An optical splitter 2106, a first arm waveguide 2107, a second arm waveguide 2108 and an optical mode converter 2109 are sequentially connected between the first input and output waveguide 2105 and the first slab waveguide 2101. The splitting ratio of the optical splitter 2106 periodically changes in accordance with the optical frequency.

The individual components will now be described in detail. For the optical wavelength multiplexing/demultiplexing circuit 2100, a relative index difference Δ for waveguides is 1.5% and the core thickness is 4.5 μm. The widths of the arrayed waveguide 2102, the second input and output waveguides 2104, the first input and output waveguide 2105, the first arm waveguide 2107 and the second arm waveguide 2108 are 4.5 μm. Further, the lengths of the first slab waveguide 2101 and the second slab waveguide 2103 are 7600 μm. For the second input and output waveguides 2104, a number of waveguides equivalent to a number of wavelength channels are arranged at an interval of 15 μm at the portion that is connected to the second slab waveguide 2103. A linear tapered waveguide having an opening width of 12.5 μm is arranged at the terminal ends of the second input and output waveguides 2104, near the second slab waveguide 2103.

Further, for the optical wavelength multiplexing/demultiplexing circuit 2100, 400 wavelength channels are set, the optical frequency channel spacing is set to 100 GHz and the optical frequency of the center channel (the 21st channel) is set to 194.1 THz. 200 waveguides are employed for the arrayed waveguides 2102, and a difference in length between the adjacent arrayed waveguides is 33.9 μm. A difference in length between the first arm waveguide 2107 and the second arm waveguide 2108 is 2020 μm.

Figure 16:
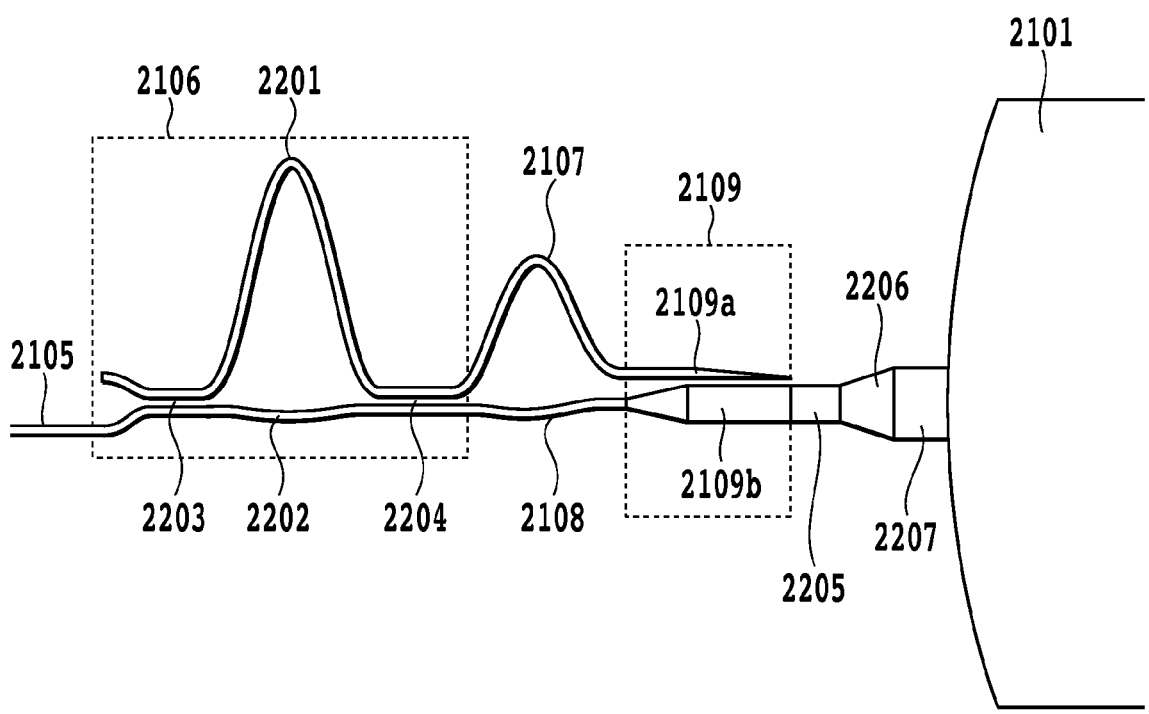
FIG. 16 is an enlarged diagram of a portion of the optical wavelength multiplexing/demultiplexing circuit for the second example, that extends from an optical splitter to a first slab waveguide.

FIG. 16 is an enlarged plan view of the portion of the optical wavelength multiplexing/demultiplexing circuit in this example, from the optical splitter 2106 to the first slab waveguide 2101. The structures of the individual components will be more specifically described.

The optical splitter 2106 includes a third arm waveguide 2201, a fourth arm waveguide 2202, a directional coupler 2203 that serves as a 1st optical splitter, and a directional coupler 2204 that serves as a 2nd optical coupler. The optical mode converter 2109 includes directional couplers, the waveguide widths of which are mutually asymmetric. A waveguide 2109a and a waveguide 2109b are respectively connected to a first arm waveguide 2107 and a second arm waveguide 2108. For the optical mode converter 2109, the waveguide 2109a has a width of 2.5 μm, and is gradually narrowed and terminated. The waveguide 2109b has a width of 8 μm and maintains the width.

The length of the directional couplers 2202 and 2203 is 1500 μm. Further, about 100% of the light that has entered the waveguide 2109a is coupled with the 1st mode light in the waveguide 2109b, so that the optical mode coupling function is provided. The waveguide 2109b is further connected to multimode waveguides 2205 and 2207. A tapered waveguide 2206 is arranged between the two multimode waveguides 2205 and 2207. The width of the waveguide 2207, connected to the first slab waveguide 2101, is set to 16.5 μm.

In the optical splitter 2106, a difference in length between the third arm waveguide 2201 and the fourth arm waveguide 2202 is 4041 μm. The coupling ratio of the directional coupler 2203 is set to 14.4%, and the coupling ratio of the directional coupler 2204 is set to 14.4%.

Figure 17:
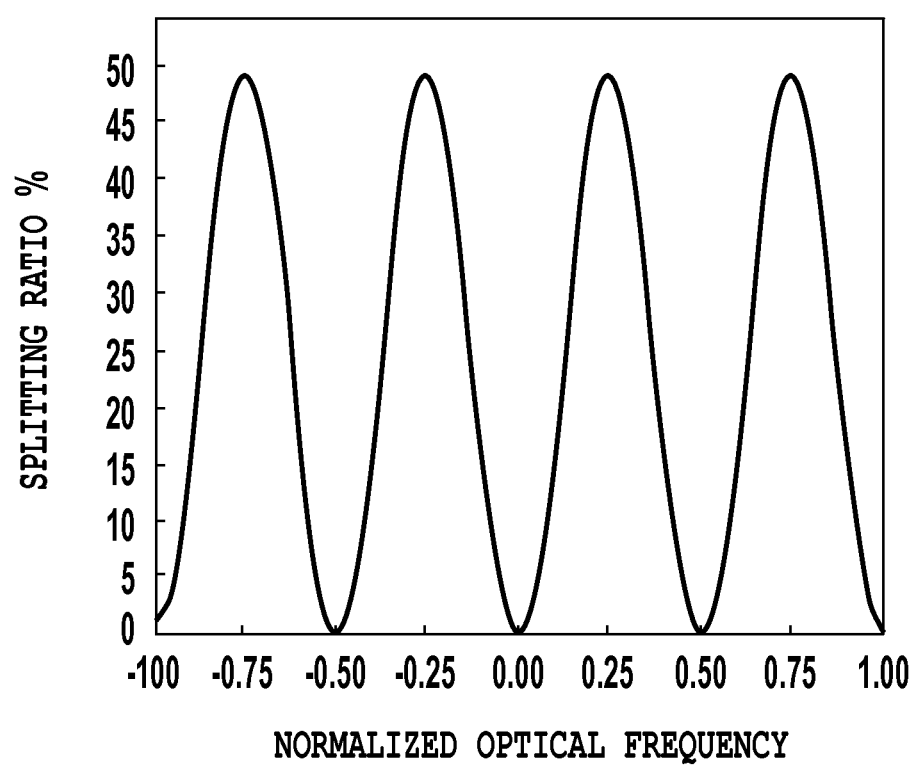
FIG. 17 is a graph showing a change in the splitting ratio of the optical splitter of the optical wavelength multiplexing/demultiplexing circuit for the second example.

FIG. 17 is a graph showing a change in the splitting ratio of the optical splitter of the optical wavelength multiplexing/demultiplexing circuit of this example. The horizontal axis represents a normalized optical frequency by employing the optical center frequency of "0" for a specific channel and an optical frequency channel spacing of "1". The splitting ratio here indicates a ratio, relative to the whole light power, of a light power that is split and guided to the first arm waveguide. In this example, the splitting ratio of the optical splitter 2106 ranges from 0% to 50%, and varies in concert with half a spacing of the optical frequency channel spacing. That is, the splitting ratio of the optical splitter 2106 is changed in accordance with the optical frequency, and reaches the minimum value 0% near the optical center frequency of the synchronized AWG. It should also be noted that the splitting ratio is comparatively increased at an optical frequency far from that of the optical center frequency.

Figure 18:
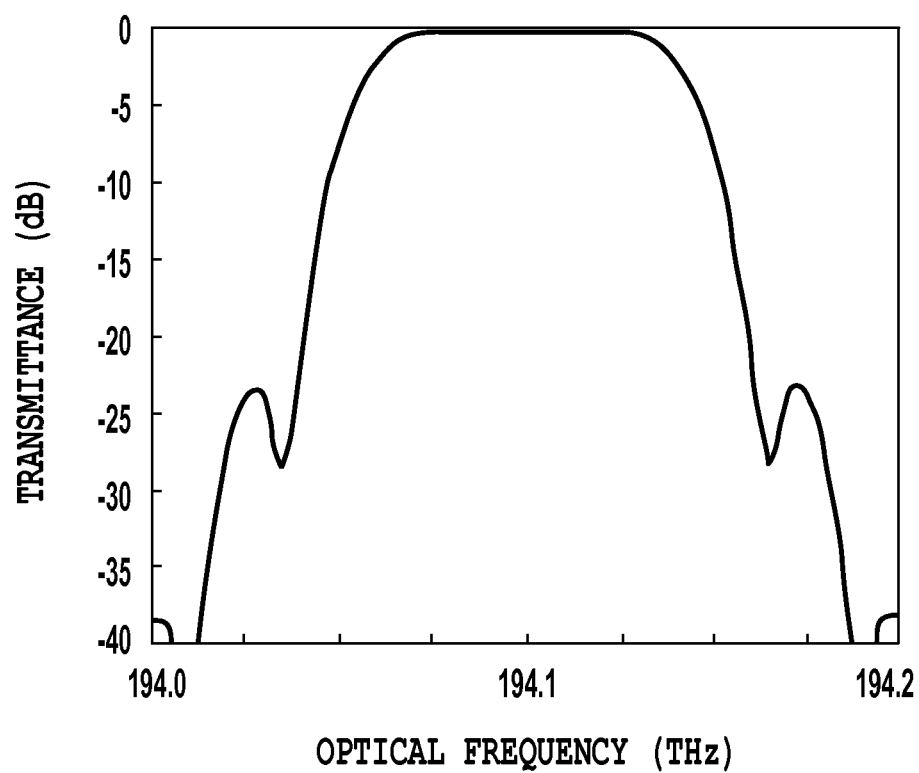
FIG. 18 is a graph showing the waveform of a transmission spectrum for the optical wavelength multiplexing/demultiplexing circuit for the second example.

FIG. 18 is a graph showing the waveform of a transmission spectrum of the center channel (the 21st channel) of the optical wavelength multiplexing/demultiplexing circuit 2100 of this example. The horizontal axis represents an optical frequency (THz), and the vertical axis represents a transmittance of dB.

Figure 19:
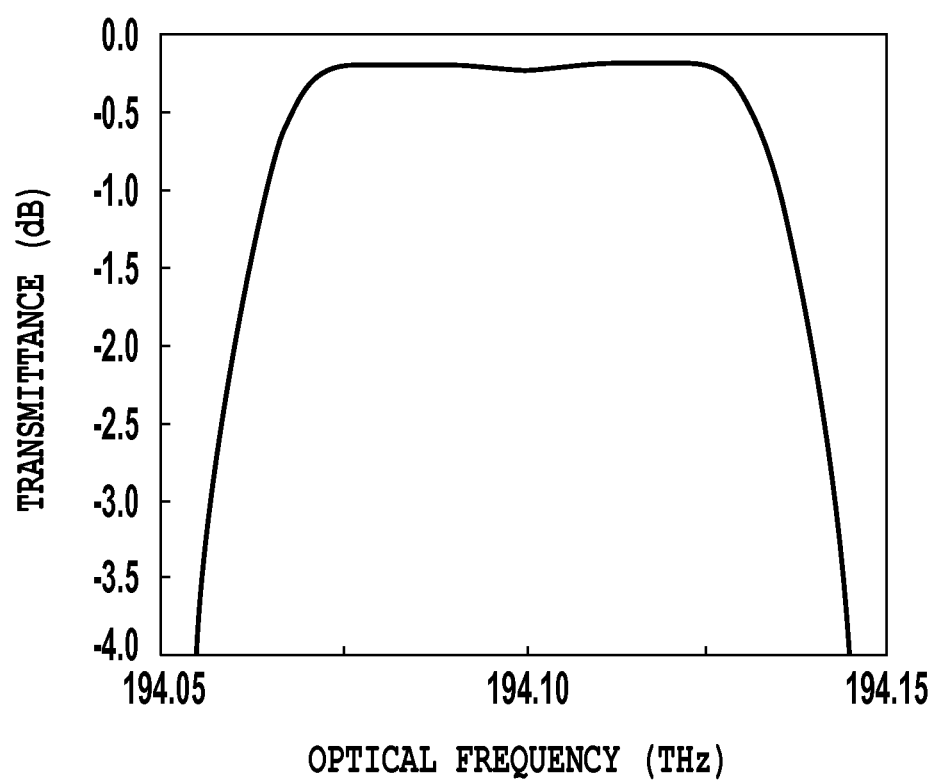
FIG. 19 is an enlarged graph for a portion near the tip of the waveform of the transmission spectrum in FIG. 18.

FIG. 19 is an enlarged graph showing the tip waveform portion of the transmission spectrum shown in FIG. 18. The horizontal axis is enlarged by two and the vertical axis is enlarged by ten. As is apparent from FIGS. 18 and 19, compared with the conventional art, the optical wavelength multiplexing/demultiplexing circuit of this example provides the increase in the passband while maintaining the flatness of the passband. In this example, the passband of 0.5 dB is 62 GHz, which is 62% of the optical frequency channel spacing (100 GHz). Compared with the conventional art, for which the maximum passband of 0.5 dB is limited to only about 45% of the optical frequency channel spacing, the passband is increased by 17%.

Figure 20:
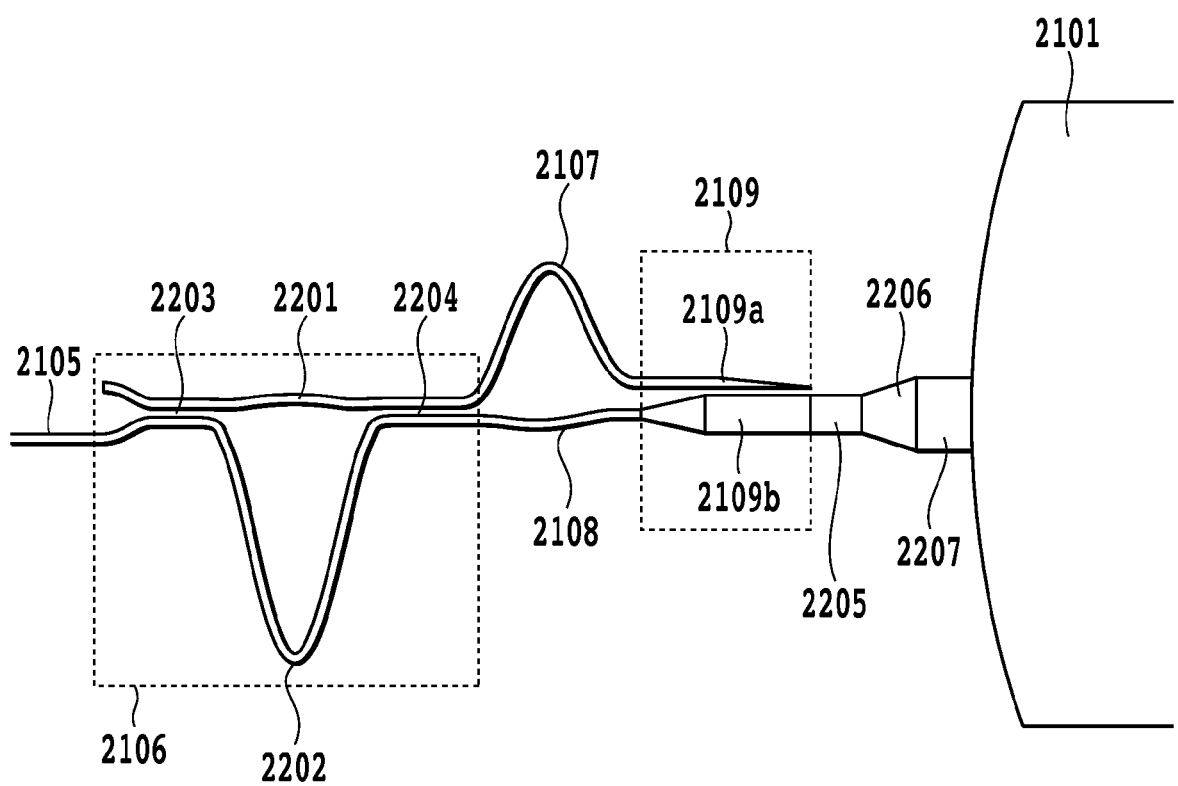
FIG. 20 is a diagram illustrating another example arrangement for the portion that extends from the optical splitter to the first slab waveguide.

FIG. 20 is a plan view of another arrangement for the portion, of the optical wavelength multiplexing/demultiplexing circuit of this example, extending from the optical splitter to the first slab waveguide. Although this arrangement is different from the one shown in FIG. 16, the same operation can be performed. The structure shown in FIG. 16 is employed for the structure and design of the first arm waveguide 2107, the second arm waveguide 2108 and the optical mode converter 2109. For the optical splitter 2106 of this example, the fourth arm waveguide 2202 is longer than the third arm waveguide 2201, and the difference in their lengths is 4041 μm. The coupling ratio of the directional coupler 2203 is set to 14.4%, and the coupling ratio of the directional coupler 2204 is set to 14.4%. The optical wavelength multiplexing/demultiplexing circuit that employs this arrangement can provide transmission characteristics, like those shown in FIGS. 18 and 19, that include a broad passband and flatness.

Figure 21:
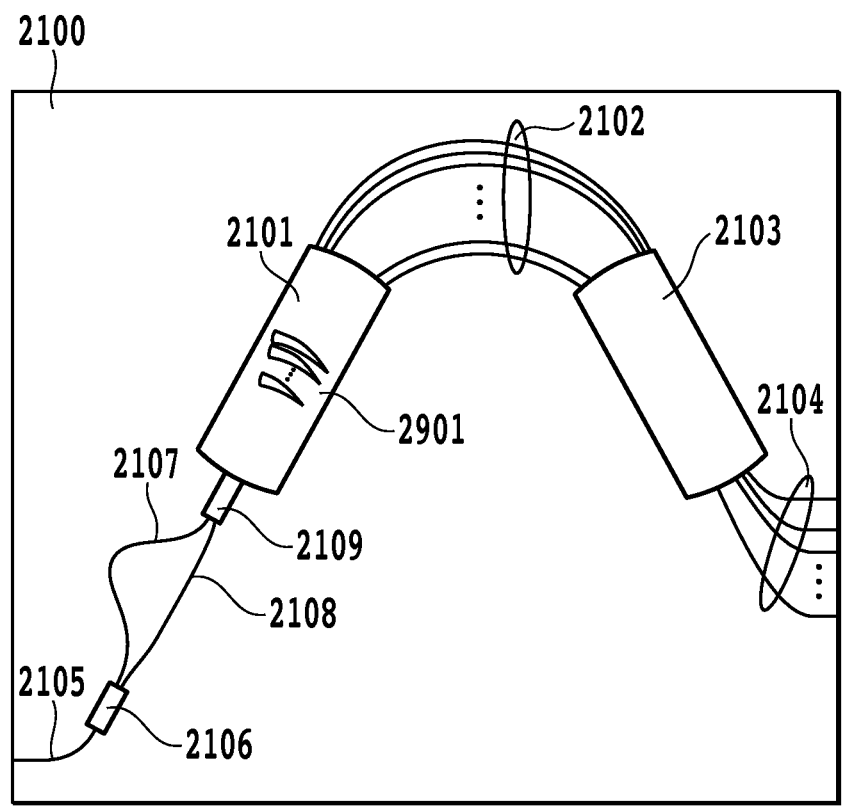
FIG. 21 is a diagram showing another example arrangement for the optical wavelength multiplexing/demultiplexing circuit shown in FIG. 15, wherein the temperature dependence of an optical center frequency is suppressed.

FIG. 21 is a diagram illustrating the structure for an example, wherein the temperature dependence of the center frequency is more suppressed for the optical wavelength multiplexing/demultiplexing circuit in FIG. 15. An explanation will be given for grooves formed in a slab waveguide, which is a different structure from that shown in FIG. 15.

Figure 22:
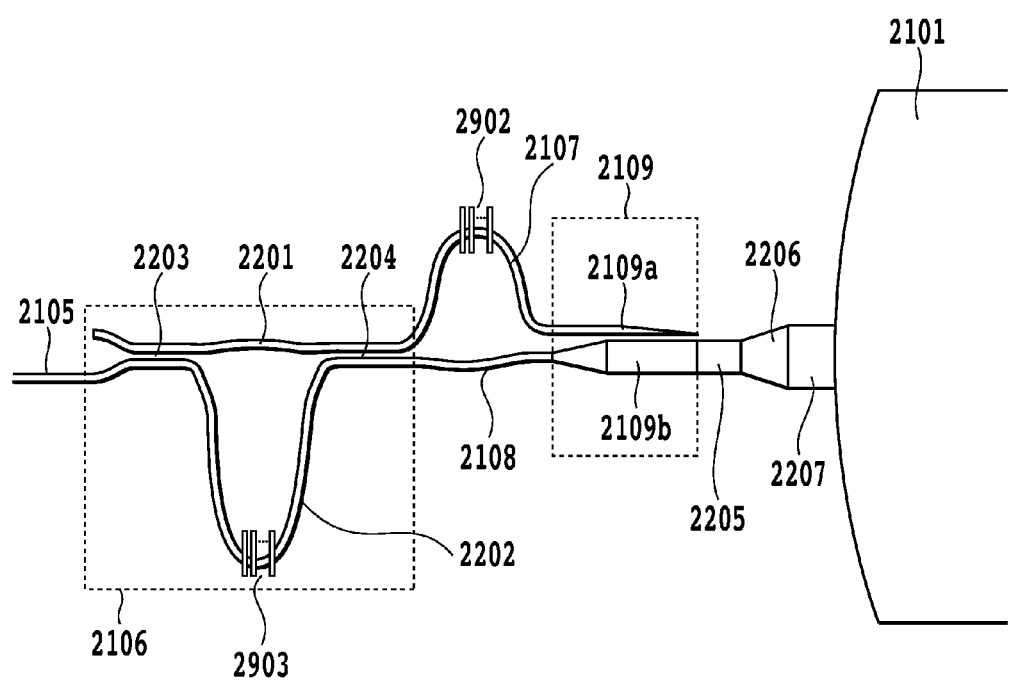
FIG. 22 is an enlarged diagram showing a portion of the example in which dependence on temperature is suppressed, that extends from the optical splitter to the first slab waveguide.
Figure 23:
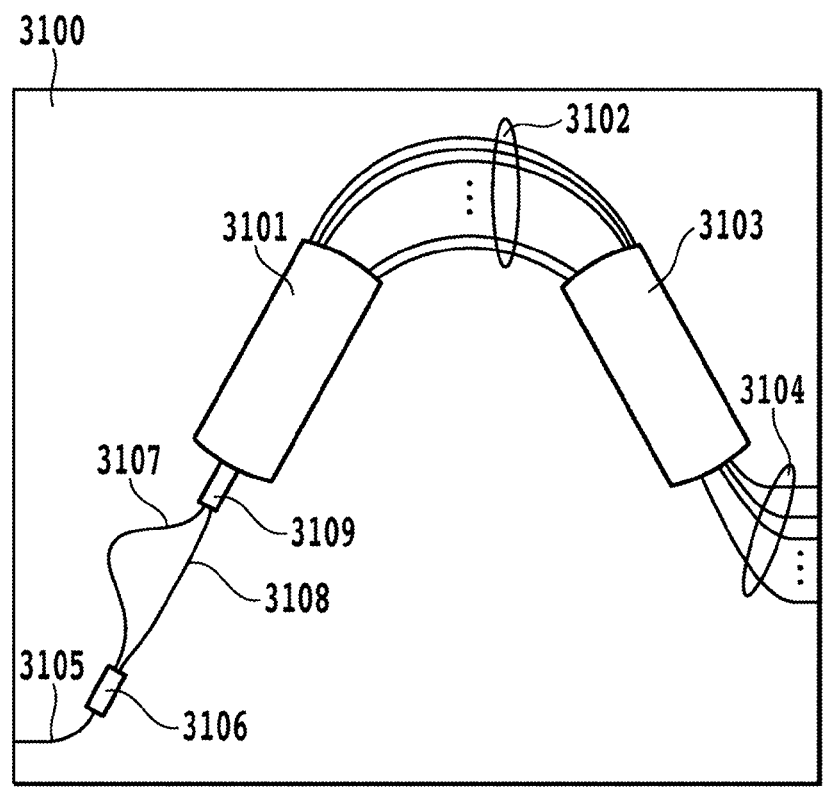
FIG. 23 is a diagram illustrating an example arrangement for a conventional synchronized AWG type of optical wavelength multiplexing/demultiplexing circuit.
Figure 24:
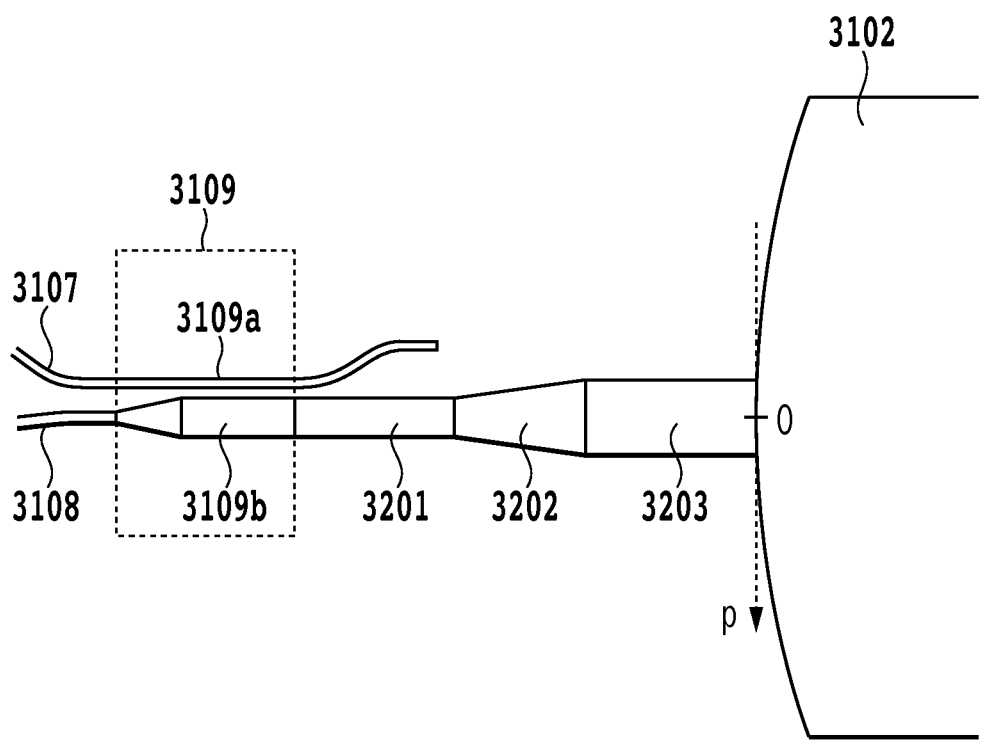
FIG. 24 is a diagram illustrating the structure of the vicinity of the optical mode converter in the conventional optical wavelength multiplexing/demultiplexing circuit.
Figure 25:
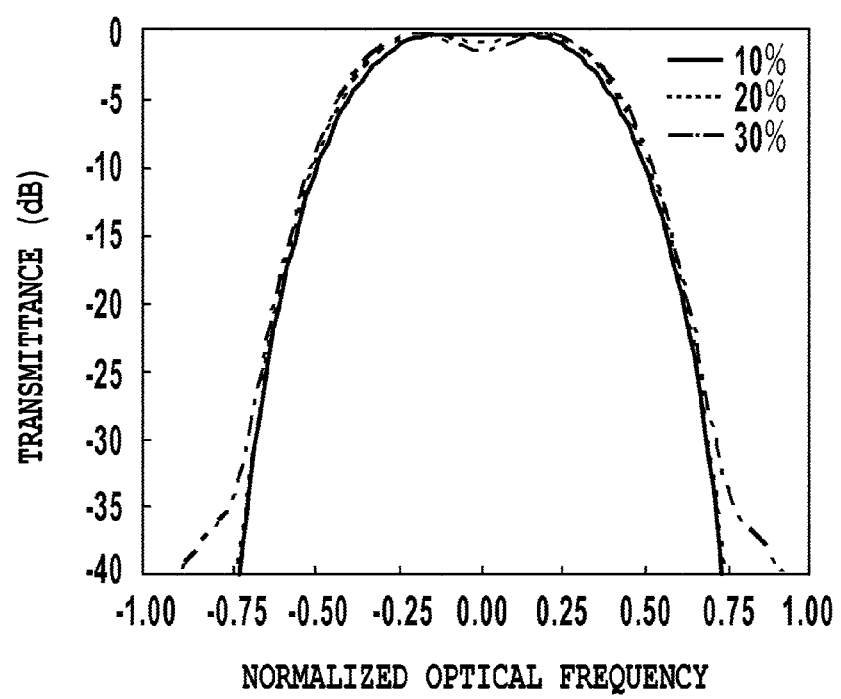
FIG. 25 is a graph showing the waveform of a transmission spectrum for the conventional synchronized AWG, while the intensity ratio of the 1st mode light is employed as a parameter.
Figure 26:
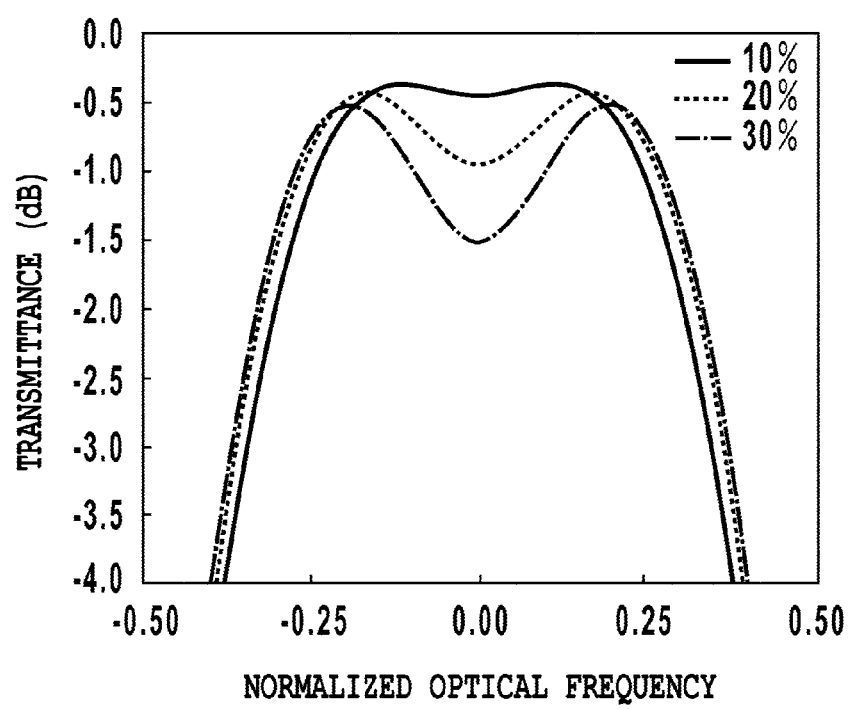
FIG. 26 is an enlarged graph for the portion near the tip of the waveform of the transmission spectrum shown in FIG. 25.
Figure 27:
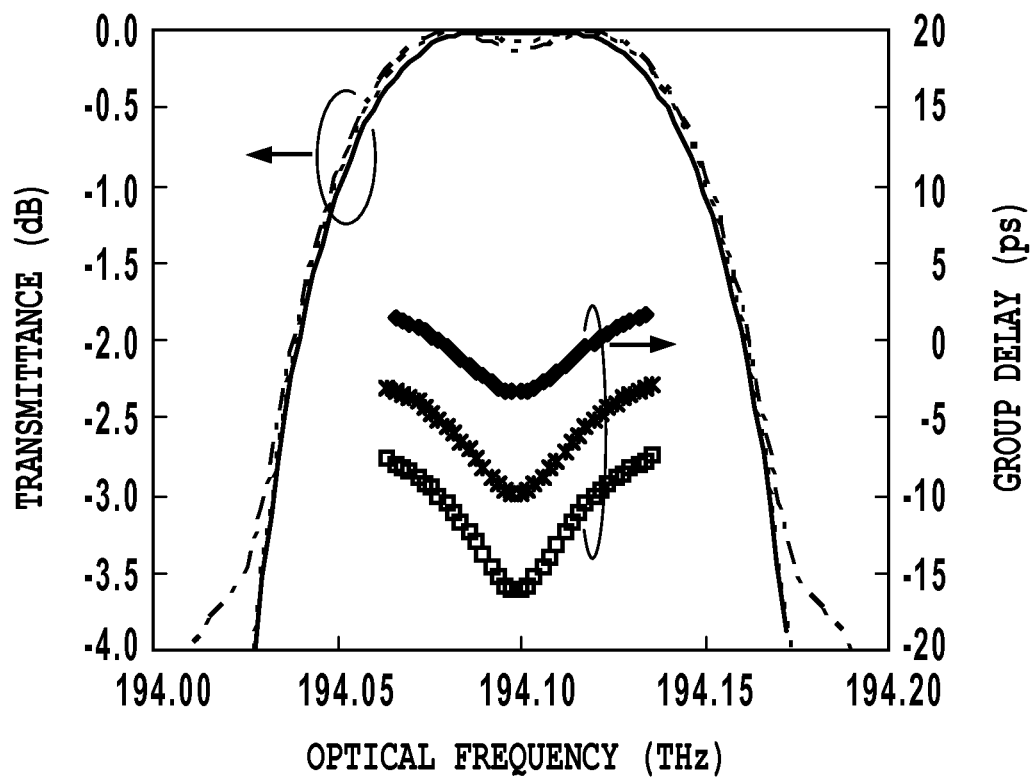
FIG. 27 is a graph showing a transmission spectrum and a group delay spectrum for the conventional synchronized AWG, while the intensity ratio of the 1st mode light is employed as a parameter.

FIG. 22 is an enlarged diagram showing the portion of the arrangement with suppressed temperature dependence for this example, extending from the optical splitter to the first slab waveguide. An explanation will also be given for grooves formed in arm waveguides that are different from the arrangement in FIG. 20.

As shown in FIG. 21, grooves 2901 are formed in the first slab waveguide 2101 so as to cut off the waveguide. Further, referring to FIG. 22, grooves 2902 and 2903 are formed to cut off the first arm waveguide 2107 and the third arm waveguide 2201. As a material (a temperature compensation material), for which a temperature coefficient of a refractive index differs from a temperature coefficient of the effective refractive index of the waveguide, a silicone resin is filled into all of the grooves.

The grooves 2901 in FIG. 21 are formed in a curved triangular shape, so that the groove width is changed in accordance with the wavelength of a light wave. More specifically, when $W_1$ denotes the width of a groove, across which the light wave passes and is propagated in the first slab waveguide 2101 so as to enter one of the arrayed waveguides 2102, and $W_2$ denotes the width of a groove across which the light wave passes in the first slab waveguide 2101 and enters the other waveguide, in the arrayed waveguides 2102, that is located immediately outside the previously described waveguide, a difference between $W_1$ and $W_2$ satisfies a relationship represented by the following expression.

$$W_1 - W_2 = -\alpha/\alpha' \times \Delta L \qquad \text{Ex. (2)}$$

In this case, ΔL represents a difference in length between arrayed, adjacent waveguides, α represents the temperature coefficient of the effective refractive index for the arrayed waveguides, and α' represents the temperature coefficient of the refractive index for the temperature compensation material to be filled. The grooves 2901 are located at eight separate places to reduce, to the extent possible, diffraction loss, in the groove, of a light wave. It should be noted that the grooves 2901 are provided so that the sum of the widths of these separate grooves satisfies the condition in expression (2).

The grooves 2902 in FIG. 22 have a width that establishes $-\alpha/\alpha' \cdot \Delta l_1$. Here, $\Delta l_1$ indicates a difference in length of the first arm waveguide 2107 relative to the second arm waveguide 2108. The grooves 2903 have a width that establishes $-\alpha/\alpha' \cdot \Delta l_1$. Here, $\Delta l_2$ indicates a difference in length of the third arm waveguide 2201 relative to the fourth arm waveguide 2202. The grooves 2902 are arranged at six separate locations, and the grooves 2903 are arranged at ten separate locations, in order to reduce, to the extent possible, the diffraction loss, in the grooves, by a light wave. In order to maintain a diffraction loss at a predetermined value or smaller, it is preferable that the number of groove segmentations be increased when the sum of the groove widths becomes greater.

In the above described embodiment, an arrangement has been described wherein grooves are formed in the first slab waveguide and a temperature compensation material is employed to fill them; however, the present invention is not limited to this arrangement. Grooves may be also formed in the second slab waveguide, in an arrayed waveguide, or in all of these portions.

EXAMPLE 3

An optical wavelength multiplexing/demultiplexing circuit according to a third example of the present invention is characterized in that, while a transmission spectrum having a wide and flat passband is maintained, a group delay spectrum is provided that is an inversion along a group delay time axis by employing, as a line of symmetry, a line for a constant group delay (hereinafter referred to as a constant group delay line). When optical wavelength multiplexing/demultiplexing circuits such as those that have inverted group delay spectra are employed together, deviations in group delay, along a constant group delay line used as a reference, that are present in the individual optical wavelength multiplexing/demultiplexing circuits, can offset each other. Thus, deviations in group delay for the entire optical module can be effectively reduced, thereby providing the optical module with a suppressed transmission distortion. Furthermore, when optical wavelength multiplexing/demultiplexing circuits, used for this example, that have different group delay spectra are employed as a pair, an optical communication system for which the degrading of transmission quality is reduced can be provided. First, an optical wavelength multiplexing/demultiplexing circuit that has an inverted group delay spectrum will be described.

Figure 28:
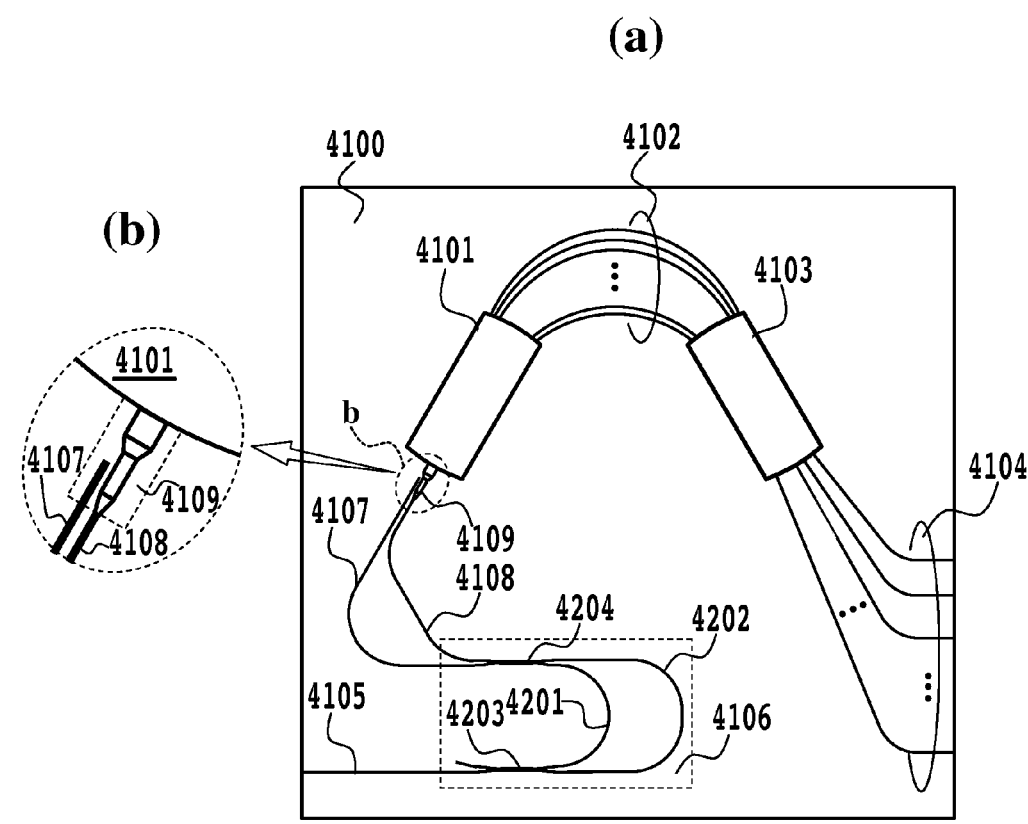
FIG. 28 is a diagram illustrating a first arrangement for an optical wavelength multiplexing/demultiplexing circuit according to a third example.

FIG. 28 is a diagram illustrating a first arrangement for the optical wavelength multiplexing/demultiplexing circuit of this example; (a) shows the general structure, and (b) is an enlarged diagram of the vicinity of a multimode waveguide 4109. An optical wavelength multiplexing/demultiplexing circuit 4100 in this example has a circuit structure layout having a smaller chip dimension than the optical wavelength multiplexing/demultiplexing circuit shown in FIG. 20. In this example, the length of a second arm waveguide 4108 is greater than that of a first arm waveguide 4107, and the difference in length for the two arm waveguides is 2020 µm. Further, for an optical splitter 4106 in this example, the length of a fourth arm waveguide 4202 is greater than that of a third arm waveguide 4201, and the difference in length is 4041 µm. The coupling ratio of a directional coupler 4203 is set to 14.4%, and the coupling ratio of a directional coupler 4204 is set to 14.4%. The other circuit parameters have the same values as those employed for the optical wavelength multiplexing/demultiplexing circuit shown in FIG. 20.

Figure 29:
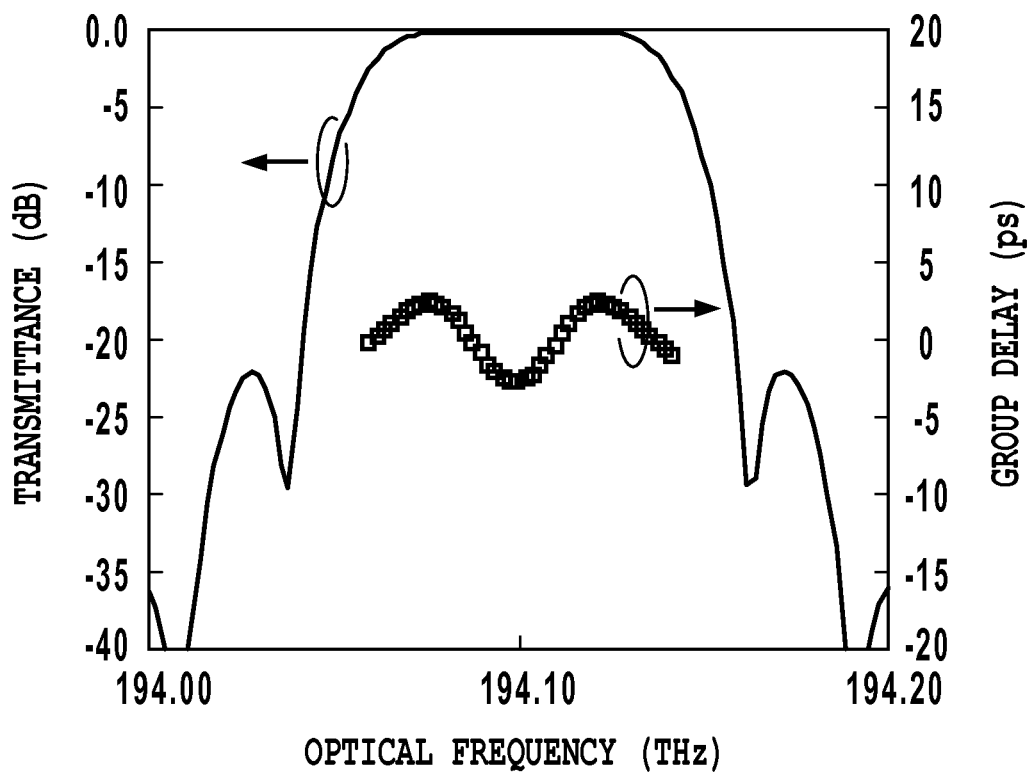
FIG. 29 is a graph showing a transmission spectrum and a group delay spectrum for the optical wavelength multiplexing/demultiplexing circuit employing the first arrangement.

FIG. 29 is a graph showing a transmission spectrum and a group delay spectrum for the first arrangement of the optical multiplexing/demultiplexing circuit of this example. Since only the circuit structure layout is rearranged for this arrangement of the optical wavelength multiplexing/demultiplexing circuit, a transmission spectrum having a wide and flat passband, as was explained in example 2 while referring to FIG. 18, is obtained. The group delay spectrum is shaped like an "M", although deviations in a group delay is limited to a small range, within ±5 ps.

FIG. 30 is a diagram illustrating a second arrangement for the optical wavelength multiplexing/demultiplexing circuit of this example; (a) shows the general arrangement, and (b) is an enlarged diagram of the vicinity of a multimode waveguide 4109. An optical wavelength multiplexing/demultiplexing circuit 5100 is so designed that a transmission spectrum is equal to, and a group delay spectrum is inverted to that of the optical wavelength multiplexing/demultiplexing circuit 4100 shown in FIG. 28. Compared with the arrangement for the optical wavelength multiplexing/demultiplexing circuit 4100 in FIG. 28, a second arm waveguide 5108 is formed so longer than a first arm waveguide 5107 and the difference in their lengths is 2020 µm, so that the sign of a value indicating an optical path length difference between the first arm waveguide 5107 and the second arm waveguide 5108 is inverted. Further, compared with the arrangement for the optical wavelength multiplexing/demultiplexing circuit 4100, a fourth arm waveguide 5202 in an optical splitter 5106 is formed so shorter than a third arm waveguide 5201 and the difference in length is 4041 µm, so that the sign of a value indicating an optical path length difference between the third arm waveguide 5201 and the fourth arm waveguide 5202 is inverted. The other circuit parameters have the same values as employed for the optical wavelength multiplexing/demultiplexing circuit 4100 in FIG. 28.

Figure 31:
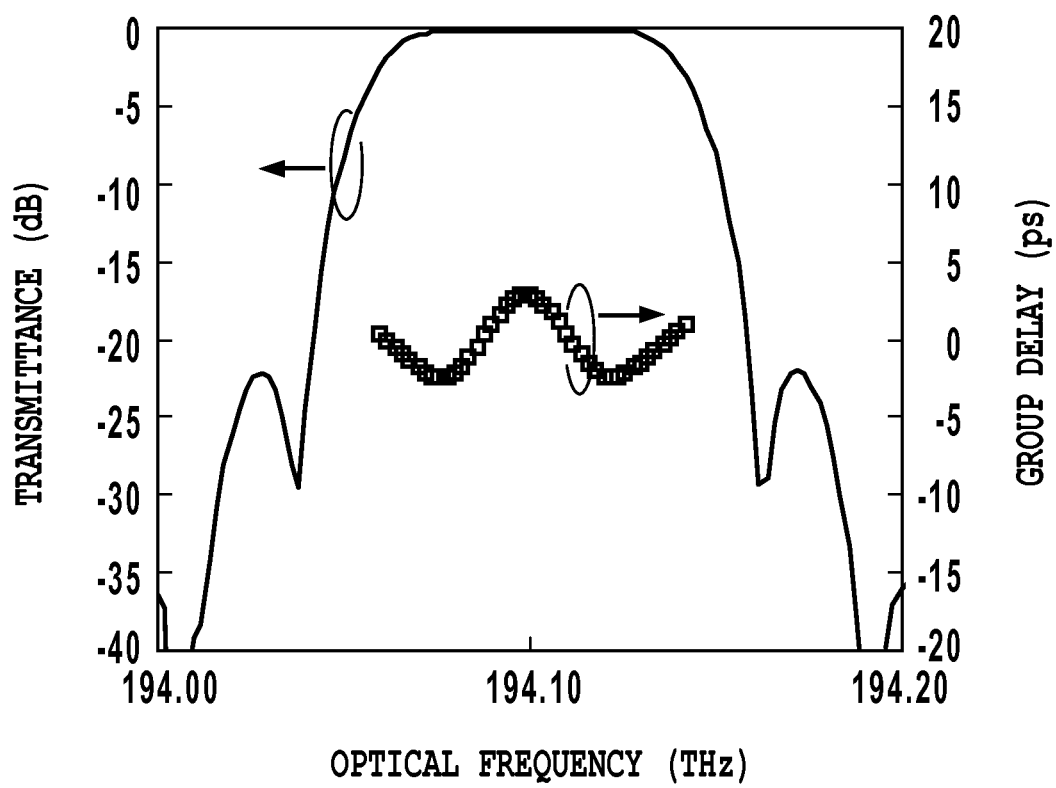
FIG. 31 is a graph showing a transmission spectrum and a group delay spectrum for the optical wavelength multiplexing/demultiplexing circuit employing the second arrangement.

FIG. 31 is a graph showing a transmission spectrum and a group delay spectrum for the second arrangement of the optical wavelength multiplexing/demultiplexing circuit of this example. A transmission spectrum having a wide and flat passband that has almost the same shape as in FIG. 29 is obtained. As for a group delay spectrum, as well as for the group delay spectrum for the first arrangement shown in FIG. 29, a deviation in a group delay is limited to a small range of 5 µm. However, unlike the first arrangement, for the optical wavelength multiplexing/demultiplexing circuit 5100 of the second arrangement, a group delay spectrum is shaped like a "W". This W-shaped group delay spectrum is virtually a complete inversion of the M-shaped group delay spectrum along the group delay time axis. That is, the optical wavelength multiplexing/demultiplexing circuit of the second arrangement includes a group delay spectrum having an inverted shape, along a specific constant group delay line, of the group delay spectrum of the optical wavelength multiplexing/demultiplexing circuit of the first arrangement.

Figure 32:
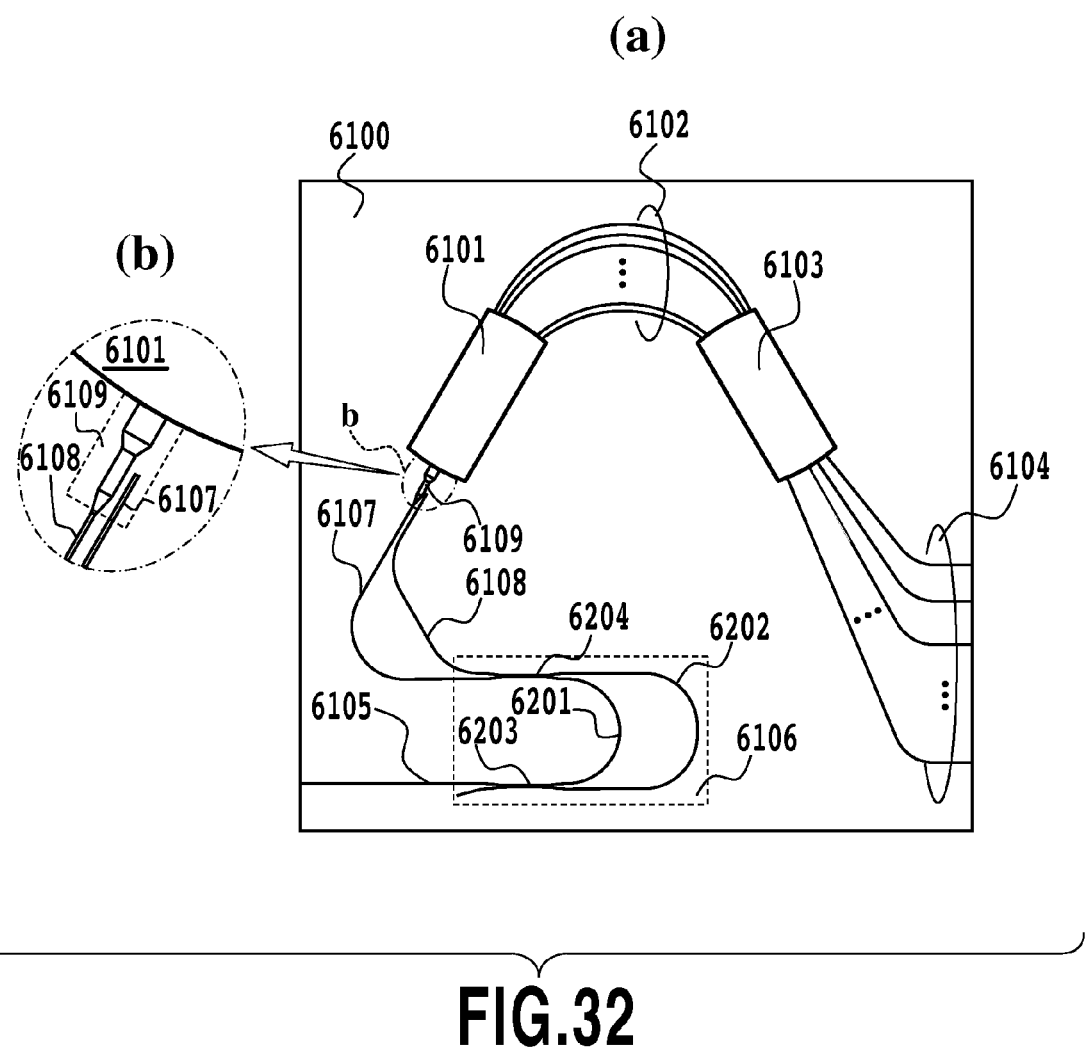
FIG. 32 is a diagram illustrating a third arrangement for an optical wavelength multiplexing/demultiplexing circuit according to the third example.

FIG. 32 is a diagram illustrating a third arrangement, smaller than the second arrangement in FIG. 30, for an optical wavelength multiplexing/demultiplexing circuit: (a) shows the general arrangement, and (b) is an enlarged diagram of the vicinity of a multimode waveguide 4109a. This arrangement includes the same inverted group delay spectrum as that shown in FIG. 30 for the optical wavelength multiplexing/demultiplexing circuit of the second arrangement. The chip size can be reduced by reviewing not only the general layout for a splitter 5106, etc., but also the details of the circuit arrangement.

An optical wavelength multiplexing/demultiplexing circuit 6100 employing the third arrangement in FIG. 32 is different, in the following points, from the optical wavelength multiplexing/demultiplexing circuit 4100 that employs the first arrangement in FIG. 28. First, a connection for a first input and output waveguide 6105 is reversed between two input terminals of an optical coupler 6203 that is located at the 1st stage in a splitter 6106. Further, the length of an optical path equivalent to half a wavelength is added to the optical path length difference between a first arm waveguide 6107 and a second arm waveguide 6108. Furthermore, an optical mode converter 6109 is located at an inverted position, relative to that of the first arrangement, symmetrically displayed along the incident axis, and connections for the first arm waveguide 6107 and the second arm waveguide 6108 to the two input terminals of the optical mode converter 6109 are reversed.

Figure 33:
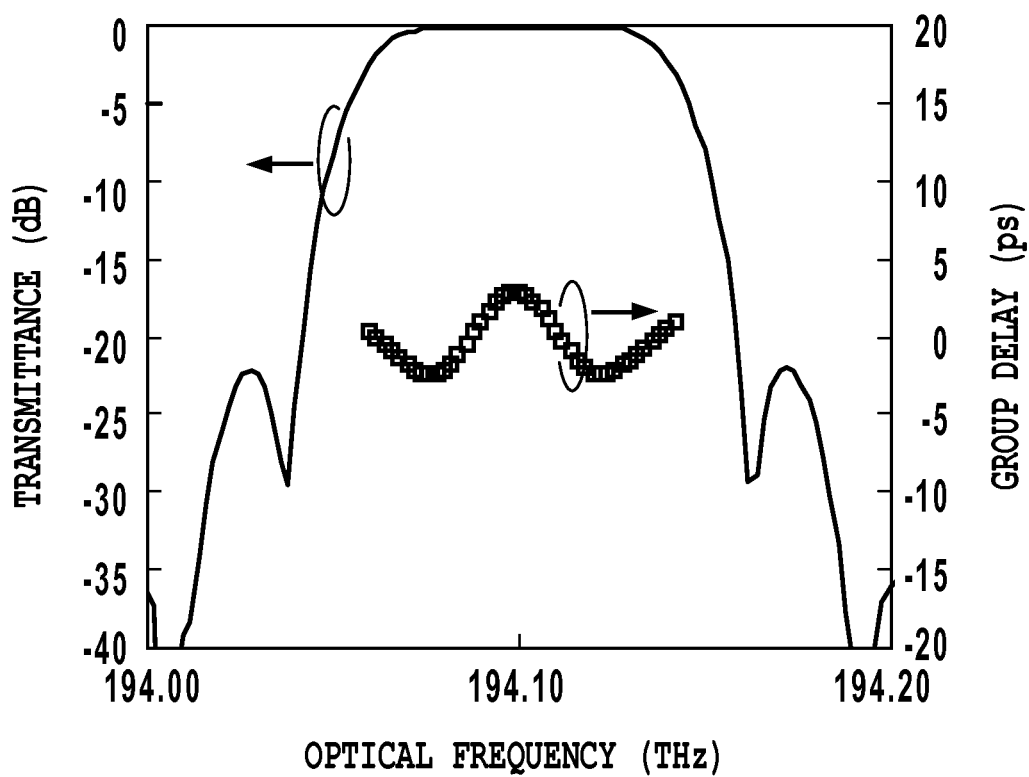
FIG. 33 is a graph showing a transmission spectrum and a group delay spectrum for the optical wavelength multiplexing/demultiplexing circuit employing the third arrangement.

FIG. 33 is a graph showing a transmission spectrum and a group delay spectrum for the third arrangement of the optical wavelength multiplexing/demultiplexing circuit of this example. The spectral characteristics obtained for the transmission spectrum and the group delay spectrum have almost the same shape as those shown in FIG. 31 for the optical wavelength multiplexing/demultiplexing circuit of the second arrangement. That is, the optical wavelength multiplexing/demultiplexing circuit of the third arrangement has a group delay spectrum with an inverted shape, along a specific constant group delay line, of the group delay spectrum of the optical wavelength multiplexing/demultiplexing circuit of the first arrangement.

For simplification, the above described optical wavelength multiplexing/demultiplexing circuit of the first arrangement is called a first type optical wavelength multiplexing/demultiplexing circuit. Further, the optical wavelength multiplexing/demultiplexing circuits of the second arrangement and the third arrangement are called second type optical wavelength multiplexing/demultiplexing circuits, because compared with the first type optical wavelength multiplexing/demultiplexing circuit, these circuits include a characteristic group delay spectrum with an inverted shape along the group delay axis.

Figure 34:
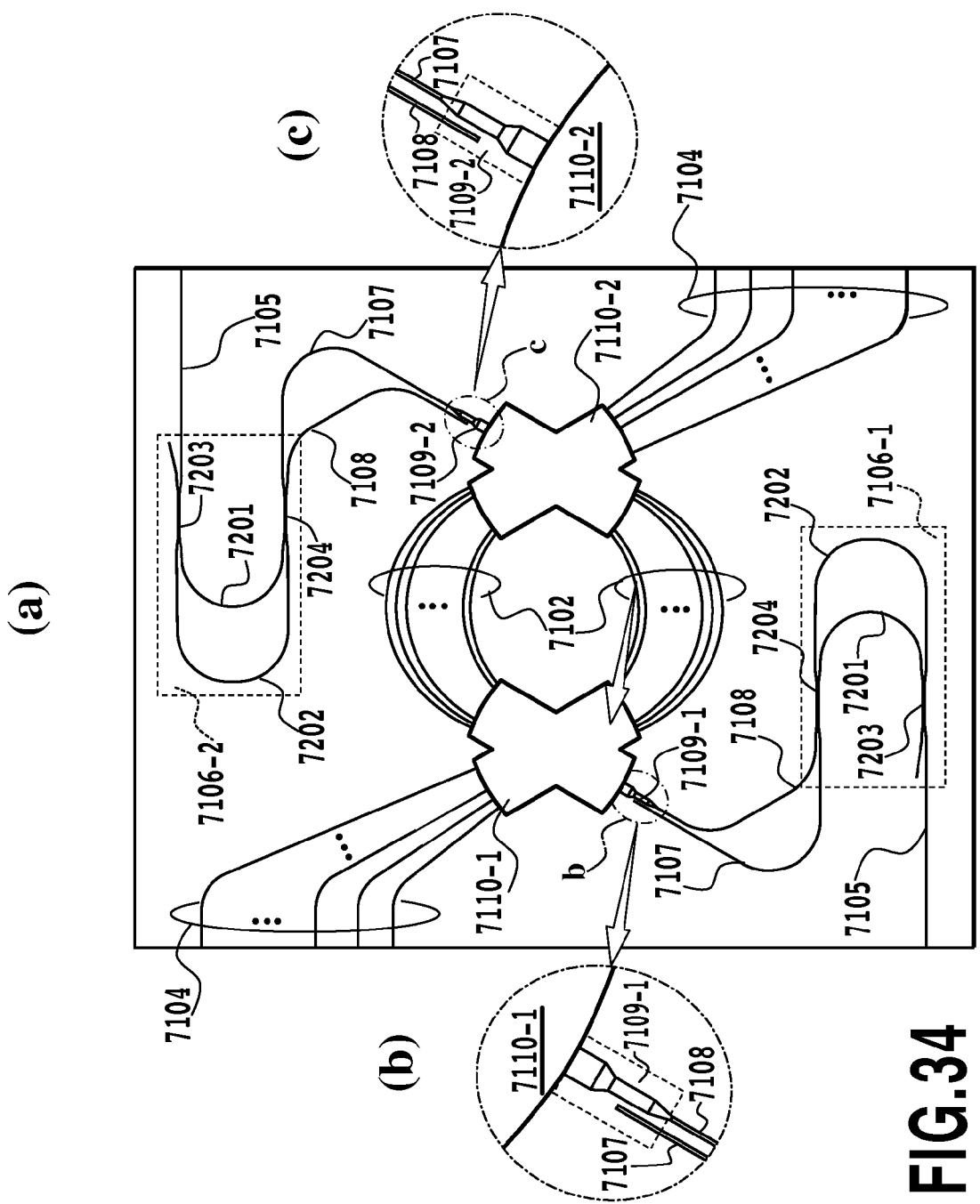
FIG. 34 is a diagram illustrating the structure of an optical wavelength multiplexing/demultiplexing circuit wherein the first and the third arrangements of the third example are integrated on a single chip.

FIG. 34 is a diagram illustrating a configuration that employs the two different optical wavelength multiplexing/demultiplexing circuits of the first arrangement and the third arrangement. (a) shows the general configuration, and (b) and (c) are enlargement diagrams showing the vicinities of multimode waveguides 7109-1 and 7109-2. The optical wavelength multiplexing/demultiplexing circuit 4100 of the first arrangement shown in FIG. 28 and the optical wavelength multiplexing/demultiplexing circuit 6100 of the third arrangement shown in FIG. 32 are mounted on one chip. That is, the first type of optical wavelength multiplexing/demultiplexing circuit and the second type of optical wavelength multiplexing/demultiplexing circuit are included in a single assembly.

In FIG. 34, a splitter 7106-1, located lower left in the drawing, corresponds to the splitter in the first arrangement, and a splitter 7106-2, located upper right in the drawing, corresponds to the splitter in the third arrangement. According to the configuration shown in FIG. 34, it is possible to compactly integrate, on one chip, the optical wavelength multiplexing/demultiplexing circuits of two AWG types, the first and the second, which acquire group delay spectra having shapes either to "M" or "W", each of which is a vertical inversion of the other, and transmission spectra that provide almost the same wide and flat passband.

Recently, from the viewpoint of system downsizing and parts standardization, it is common for a plurality of optical devices to be mounted in one optical module to perform functions that are frequently employed. One such example is an optical module called a ROADM (Reconfigurable Optical Add prop Module). In the ROADM module, a WDM-multiplexed input optical signal is demultiplexed by an optical wavelength multiplexing/demultiplexing circuit used for demultiplexing, and thereafter, signal processing, such as drop or add, is performed for the demultiplexed signals having wavelengths. Finally, these signals are again multiplexed by the optical wavelength multiplexing/demultiplexing circuit, and WDM-multiplexed light is output by the optical module. As described above, the optical module that processes a WDM signal in one operation frequently employs, as an pair, an optical wavelength multiplexing/demultiplexing circuit for performing demultiplexing and an optical wavelength multiplexing/demultiplexing circuit for performing multiplexing. The ROADM module is employed for a ring network, etc., and it is requested that the quality of a transmission signal not be degraded, even when the ROADM modules are cascaded at ten and several stages or more. Therefore, the width and flatness at high level for a passband are requested, and ultimate flatness for a group delay spectrum are also requested for the ROADM module.

Figure 35:
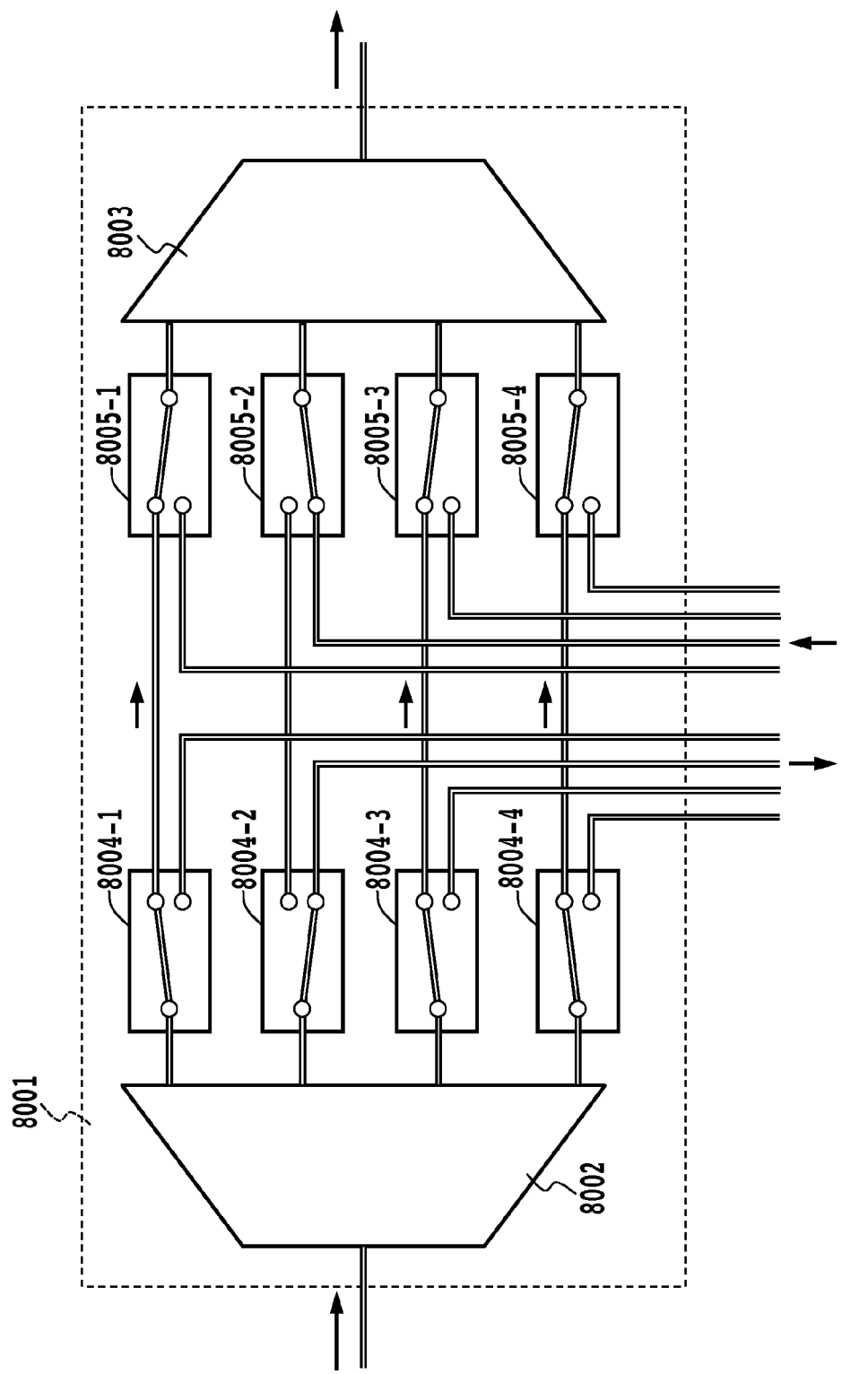
FIG. 35 is a diagram illustrating the arrangement of an optical module that includes the optical wavelength multiplexing/demultiplexing circuits according to the third example.

FIG. 35 is a diagram illustrating the arrangement of an optical module wherein overall deviation of a group delay spectrum is offset by employing a plurality of optical wavelength multiplexing/demultiplexing circuits, according to the example that includes inverted group delay spectra. An optical module 8001 shown in FIG. 35 is a ROADM module that employs optical wavelength multiplexing/demultiplexing circuits having the arrangement for example 3. The optical module 8001 includes optical wavelength multiplexing/demultiplexing circuits 8002 and 8003, 1×2 optical switches 8004-1 to 8004-4 and 2×1 optical switches 8005-1 to 8005-4. Signal processing, such as prop or Add, can be performed for each of signal having four wavelengths.

When two AWG types, the first type and the second type, are applied for optical wavelength multiplexing/demultiplexing circuits, the ROADM module can also obtain a flat group delay. Specifically, the first arrangement is employed for the optical wavelength multiplexing/demultiplexing circuit 8002 that performs demultiplexing, and the second or the third arrangement is employed for the optical wavelength multiplexing/demultiplexing circuit 8003 that performs multiplexing. With the arrangement of this ROADM module, the "M"-shaped group delay spectrum, of the optical wavelength multiplexing/demultiplexing circuit 8002 that employs the first arrangement, and the "W"-shaped group delay spectrum, of the optical wavelength multiplexing/demultiplexing circuit 8003 that employs the second or the third arrangement, are offset from each other. Compared with a conventional ROADM module, a wide and flat passband (transmission spectrum) is provided, and also a flat group delay characteristic (group delay spectrum) for the overall optical module 8001 can be obtained.

Figure 36:
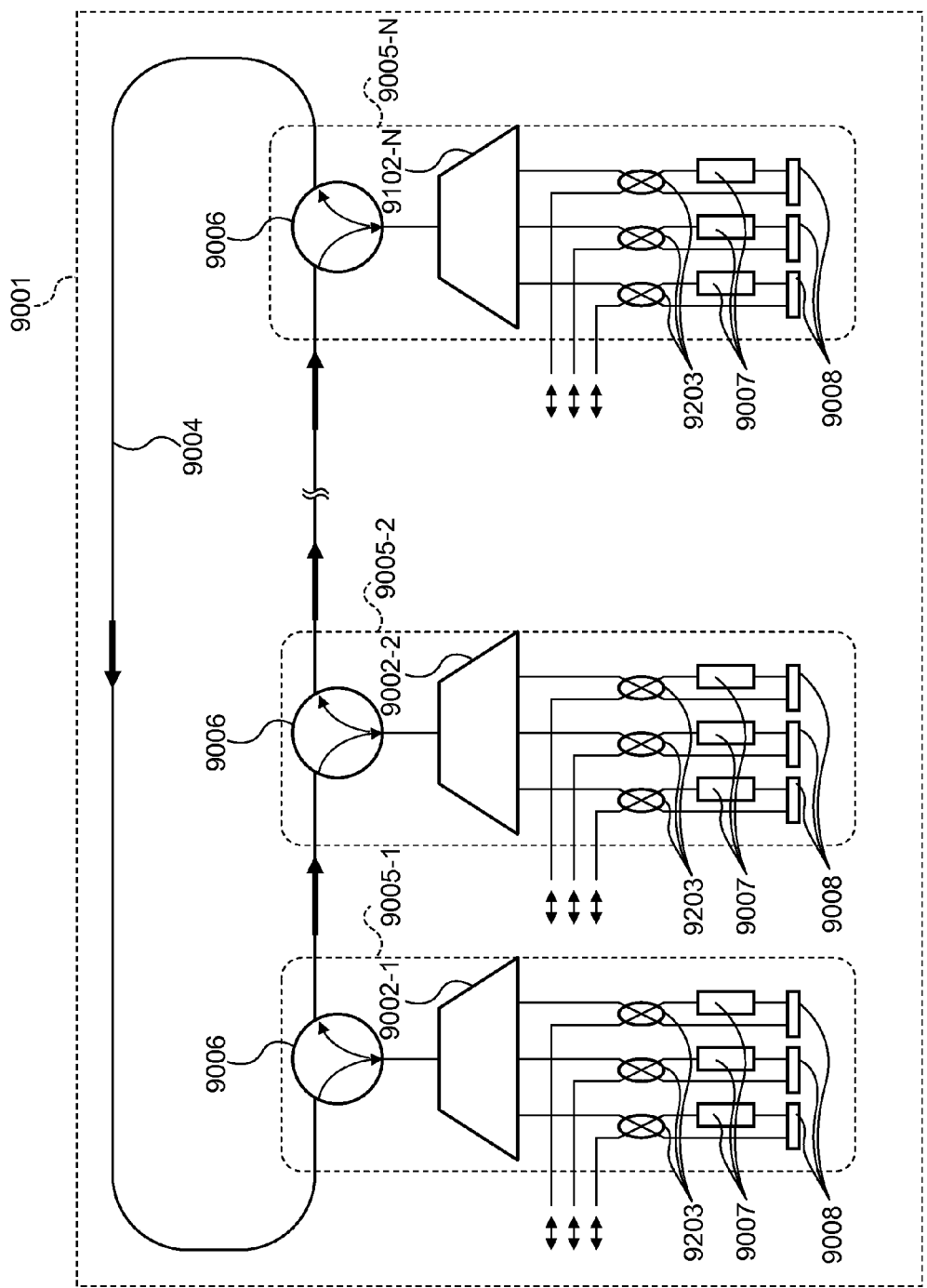
FIG. 36 is a diagram illustrating the arrangement of an optical communication system that includes the optical wavelength multiplexing/demultiplexing circuits according to the third example.

FIG. 36 is a diagram illustrating the arrangement of an optical communication system 9001 according to this example. The degrading of transmission quality can be reduced by employing optical wavelength multiplexing/demultiplexing circuits for which group delay spectra are inverted along a group delay time axis. In the optical communication system 9001, N node offices 9005-1, 9005-2, . . . and 9005-N are connected to a ring network 9004. Each of the node offices includes an optical circulator 9006, optical wavelength multiplexing/demultiplexing circuits 9002-1 to 9002-N, directional couplers 9203, phase shifters 9007 and total reflection terminals 9008.

In order to form a very inexpensive optical transmission network, the number of devices for each node should be reduced while suppression of the degrading of transmission quality is maintained. In the optical communication system 9001 in FIG. 36, each of the node offices 9005-1 to 9005-N includes only one optical wavelength multiplexing/demultiplexing circuit 9002-1 to 9002-N. At this time, when the first arrangement (first type) and the second arrangement or the third arrangement (second type) are alternately employed for the optical wavelength multiplexing/demultiplexing circuits 9002-1 to 9002-N, the group delay spectra for the individual node offices 9005-1 to 9005-N, interconnected via the ring network 9004, can be flattened. Furthermore, when the first type of optical wavelength multiplexing/demultiplexing circuits and the second type of optical wavelength multiplexing/demultiplexing circuits are prepared equivalent in number in one section of the network, flattening of the group delay spectra can be more effectively performed.

For example, when N is an even number, the optical wavelength multiplexing/demultiplexing circuit 9002-1 employs the first arrangement and the optical wavelength multiplexing/demultiplexing circuit 9002-2 employs the third arrangement, the optical wavelength multiplexing/demultiplexing circuit 9002-3 again employs the first arrangement, . . . and the optical wavelength multiplexing/demultiplexing circuit 9002-N again employs the third arrangement. That is, N/2 optical wavelength multiplexing/demultiplexing circuits of the first arrangement (first type) and N/2 optical wavelength multiplexing/demultiplexing circuits of the third arrangement (second type) can be alternately arranged. As a result, at each interval along a transmission path in the ring network 9004, deviation of group delay spectrum is not accumulated, and the extending and flattening of a passband can be provided.

In the above description, N is an even number, but is not limited to an even number. It is pointless to say, even in a case wherein N is an odd number and the same number of optical wavelength multiplexing/demultiplexing circuits are not employed for the first type and the second type, that the optical communication system of this example obtains a group delay spectrum that is flattened more than is possible with the conventional art. Further, when deviation of a group delay remains equivalent to a period for the optical wavelength multiplexing/demultiplexing circuit, deviation of a group delay for the entire optical communication system of the present invention is greatly reduced, compared with a conventional optical communication system, which does not employ an optical wavelength multiplexing/demultiplexing circuit that provides an inverted group delay spectrum according to this example.

When the optical wavelength multiplexing/demultiplexing circuit of the present invention is employed, the passband widths of the individual node offices are extended, and both the transmission amplitude and the group delay are flattened, so that the degrading of transmission quality can be reduced, even when an optical signal is passed through node offices at multiple stages.

As described above in detail, according to the optical wavelength multiplexing/demultiplexing circuit of the present invention, the flatness of a passband is maintained, and further, the band width can be greatly extended, more than that for the conventional synchronized AWG, and dependence on temperature can be eliminated. Also, an optical module and an optical communication system that reduces deviation of a group delay spectrum can be provided by using the optical wavelength multiplexing/demultiplexing circuit of the present invention.

In the above described embodiments, the relative index difference of waveguides, and the core widths and core thicknesses are designated using specified values; however, the present invention is not limited to these values. In the individual embodiments, the design parameters for the synchronized AWG are designated using specified values; likewise, however, the present invention is not limited to these parameters. Furthermore, in the above embodiments, the range for the changing of the splitting ratio of the optical splitter is designated using specified values; the present invention, however, is not limited to these values.

In the above described embodiments, a directional coupler has been employed as means that serves as an optical coupler at the 2nd stage; the present invention, however, is not limited to this means. So long as a predetermined coupling ratio is obtained, an arbitrary coupler can be employed. As an example, an MMI coupler can be employed.

In the above described embodiments, a directional coupler has been employed as means that serves as an optical splitter at the 1st stage; the present invention, however, is not limited to this means. So long as a predetermined splitting ratio is obtained, an arbitrary splitter can be employed. As an example, a Y-splitter or an MMI splitter can be employed.

Further, in the above described embodiments, the multi-mode waveguide and the tapered waveguide have been located between the optical mode converter and the first slab waveguide; the present invention, however, is not limited to this structure. The present invention is still effective for a structure wherein an optical mode converter is connected to the first slab waveguide.

In the above described embodiments, an arrangement has been employed wherein grooves are formed in the first slab waveguide, and a temperature compensation material is filled into the grooves; however, the present invention is not limited to this arrangement. The same effects can be obtained for an arrangement wherein grooves are formed in the second slab waveguide, an arrangement wherein grooves are formed in the arrayed waveguide, or an arrangement wherein grooves are formed in both of these components.

Moreover, in the above described embodiments, a silicone resin has been employed as a temperature compensation material; however, the present invention is not limited to this material. The same effects can be obtained by employing a material for which the temperature dependence of a refractive index differs from temperature dependence of the effective refractive index for the waveguide.

Furthermore, in the above described embodiments, the number of groove segments into which a temperature compensation material is to be filled is designated as a specified value; however, the present invention is not limited to these values. The same effects can be obtained, regardless of the number of segments, and in a case where grooves are not segmented.

As described above in detail, the optical wavelength multiplexing/demultiplexing circuit of the present invention is the conventional synchronized AWG type, and changes the intensity ratio of the 1st mode light by modulating the splitting ratio of the optical splitter in the interference circuit in accordance with the optical frequency. As a result, loss at the optical center frequency is reduced, and a limitation on the width of the passband, which is the conventional problem, can be resolved. Therefore, the optical wavelength multiplexing/demultiplexing circuit, for which both the flatness and the extension for the passband is obtained and the temperature is compensated for, can be provided. Further, an optical module that has a flat group delay spectrum can also be provided. Furthermore, the optical wavelength multiplexing/demultiplexing circuit can be appropriately applied for a communication system wherein one optical signal passes many points.

INDUSTRIAL APPLICABILITY

The present invention can be employed for optical communication. More specifically, the present invention can be employed for an optical module and an optical communication system that include optical wavelength multiplexing/demultiplexing circuits.

The invention claimed is:

1. An optical wavelength multiplexing/demultiplexing circuit comprising:
   an arrayed-waveguide grating including arrayed waveguides and a first slab waveguide and a second slab waveguide that are respectively connected to the ends of the arrayed waveguides;
   a first input and output waveguide optically connected to the first slab waveguide via an interference circuit; and
   a second input and output waveguide connected to the second slab waveguide, wherein
   the interference circuit includes:
      a first arm waveguide,
      a second arm waveguide extended adjacent to the first arm waveguide and having a different length,
      an optical mode converter which is connected between one ends of the first arm waveguide and the second arm waveguide and an interface of the first slab waveguide, the optical mode converter couples fundamental mode that is received from the first arm waveguide with first mode, and forms an optical field distribution representing a change in a peak position on an interface with the first slab waveguide according to a wavelength, and
      an optical splitter connected to the other ends of the first arm waveguide and the second arm waveguide,
      wherein an optical frequency spacing for the interference circuit matches an optical frequency channel spacing for the arrayed-waveguide grating, and
      a splitting ratio of the optical splitter changes with a spacing that is identical to or half the optical frequency spacing for the interference circuit, and takes a minimum value in the vicinity of an optical center frequency of each channel in the arrayed-waveguide grating.

2. The optical wavelength multiplexing/demultiplexing circuit according to claim 1, wherein the optical splitter includes:
   a third arm waveguide and a fourth arm waveguide, between which there is a difference in optical path lengths; and
   a first-stage optical coupler and a second-stage optical coupler respectively connected at both ends of the third and fourth arm waveguides.

3. The optical wavelength multiplexing/demultiplexing circuit according to claim 2, wherein the first-stage optical coupler and the second-stage optical coupler are directional couplers.

4. The optical wavelength multiplexing/demultiplexing circuit according to claim 1, wherein the optical mode converter is a directional coupler that includes two waveguides having dissimilar widths.

5. The optical wavelength multiplexing/demultiplexing circuit according to claim 2, wherein the optical mode converter is a directional coupler that includes two waveguides having dissimilar widths.

6. The optical wavelength multiplexing/demultiplexing circuit according to claim 4, wherein the width of the narrower waveguide of the two waveguides is gradually reduced from the side of the first arm waveguide, and the narrower waveguide terminated at a point a specified width is reached.

7. The optical wavelength multiplexing/demultiplexing circuit according to claim 5, wherein the width of the narrower waveguide of the two waveguides is gradually reduced from the side of the first arm waveguide, and the narrower waveguide terminated at a point a specified width is reached.

8. The optical wavelength multiplexing/demultiplexing circuit according to claim 4, wherein the narrower waveguide of the two waveguides is terminated at a predetermined location by a groove into which a light blocking material has been filled to attenuate light.

9. The optical wavelength multiplexing/demultiplexing circuit according to claim 5, wherein the narrower waveguide of the two waveguides is terminated at a predetermined location by a groove into which a light blocking material has been filled to attenuate light.

10. The optical wavelength multiplexing/demultiplexing circuit according to claim 1, wherein the optical mode converter includes two multimode interference circuits cascaded in a direction in which light travels.

11. The optical wavelength multiplexing/demultiplexing circuit according to claim 2, wherein the optical mode converter includes two multimode interference circuits cascaded in a direction in which light travels.

12. The optical wavelength multiplexing/demultiplexing circuit according to claim 2, further comprising:
    a first groove, which is formed at least across either of the arrayed waveguides, the first slab waveguide or the second slab waveguide, and the first groove is filled with a material which has a temperature coefficient of a refractive index that is different from a temperature coefficient of an effective refractive index for the waveguide where the first groove is formed, so that temperature dependence of the optical center frequency of the arrayed-waveguide grating can be compensated for;
    a second groove, which is formed in at least a longer one of either the first arm waveguide or the second arm waveguide, and the second groove is filled with a material which has a temperature coefficient of a refractive index that differs from a temperature coefficient of an effective refractive index for the waveguide wherein the second groove is formed, so that temperature dependence of a difference in optical path lengths of the first arm waveguide and the second arm waveguide can be compensated for;
    a third groove, which is formed in at least a longer one of either the third arm waveguide or the fourth arm waveguide, and the third groove is filled with a material which has a temperature coefficient of a refractive index that differs from a temperature coefficient of an effective refractive index for the waveguide wherein the third groove is formed, so that temperature dependence of a difference in optical path lengths of the third arm waveguide and the fourth arm waveguide can be compensated for.

13. The optical wavelength multiplexing/demultiplexing circuit according to claim 12, wherein at least one of the first groove, the second groove and the third groove is divided into a plurality of groove segments in the direction in which light travels.

14. An optical module comprising:
    at least one first type of optical wavelength multiplexing/demultiplexing circuit according to claim 2; and a second type of optical wavelength multiplexing/demultiplexing circuit, prepared equivalent in number to the first type, which has a transmission spectrum with the same shape as a transmission spectrum for the first type of optical wavelength multiplexing/demultiplexing circuit, and a group delay spectrum with an inverted shape of a group delay spectrum of the first type of optical waveform multiplexing/demultiplexing circuit along a group delay time axis, wherein the second type of optical wavelength multiplexing/demultiplexing circuit is configured to have an inverted value in optical path lengths difference between the first arm waveguide and the second arm waveguide of the first type of optical wavelength multiplexing/demultiplexing circuit, and further configured to have an inverted value in optical path lengths difference between the third arm waveguide and the fourth arm waveguide of the first type of optical wavelength multiplexing/demultiplexing circuit.

15. An optical communication system comprising:
at least one first type of optical wavelength multiplexing/demultiplexing circuit according to claim 2; and
a second type of optical wavelength multiplexing/demultiplexing circuit, prepared equivalent in number to the first type and arranged in the same section for transmission, which has a transmission spectrum with the same shape as a transmission spectrum for the first type of optical wavelength multiplexing/demultiplexing circuit, and a group delay spectrum with an inverted shape of a group delay spectrum of the first type of optical waveform multiplexing/demultiplexing circuit along a group delay time axis, wherein the second type of optical wavelength multiplexing/demultiplexing circuit is configured to have an inverted value in optical path lengths difference between the first arm waveguide and the second arm waveguide of the first type of optical wavelength multiplexing/demultiplexing circuit, and further configured to have an inverted value in optical path lengths difference between the third arm waveguide and the fourth arm waveguide of the first type of optical wavelength multiplexing/demultiplexing circuit.

16. An optical module comprising:
at least one first type of optical wavelength multiplexing/demultiplexing circuit according to claim 2; and
a second type of optical wavelength multiplexing/demultiplexing circuit, prepared equivalent in number to the first type, which has a transmission spectrum with the same shape as a transmission spectrum of the first type of optical wavelength multiplexing/demultiplexing circuit, and a group delay spectrum with an inverted shape of the group delay spectrum of the first type of optical wavelength multiplexing/demultiplexing circuit long a group delay time axis, wherein the second type of optical wavelength multiplexing/demultiplexing circuit is configured with respect to the first type of optical wavelength multiplexing/demultiplexing circuit such that, connections of the first input and output waveguide to two input terminals of the first-stage optical coupler are reversed, a half wavelength optical path is added to an optical path lengths difference between the first arm waveguide and the second arm waveguide, connections of the first arm waveguide and the second arm waveguide to two terminals of the optical mode converter are reversed, and the optical mode converter is inversely located so as to be symmetrical along the incident axis.

17. An optical communication system comprising:
at least one first type of optical wavelength multiplexing/demultiplexing circuit according to claim 2; and
a second type of optical wavelength multiplexing/demultiplexing circuit, prepared equivalent in number to the first type and arranged in the same section for transmission, which has a transmission spectrum with the same shape as a transmission spectrum of the first type of optical wavelength multiplexing/demultiplexing circuit, and a group delay spectrum with an inverted shape of the group delay spectrum of the first type of optical wavelength multiplexing/demultiplexing circuit along a group delay time axis, wherein the second type of optical wavelength multiplexing/demultiplexing circuit is configured with respect to the first type of optical wavelength multiplexing/demultiplexing circuit, connections of the first input and output waveguide to two input terminals of the first-stage optical coupler are reversed, a half wavelength optical path is added to an optical path lengths difference between the first arm waveguide and the second arm waveguide, connections of the first arm waveguide and the second arm waveguide to two terminals of the optical mode converter are reversed, and the optical mode converter is inversely located so as to be symmetrical along the incident axis.

* * * * *